US012267641B2

(12) United States Patent
Wilk et al.

(10) Patent No.: US 12,267,641 B2
(45) Date of Patent: Apr. 1, 2025

(54) ELECTROOSMOTIC FLOW VALVE FOR AN ELECTRONIC DEVICE

(71) Applicant: Apple Inc., Cupertino, CA (US)

(72) Inventors: Christopher Wilk, Los Gatos, CA (US); Scott C. Grinker, Belmont, CA (US); Esge B. Andersen, Campbell, CA (US); Onur I. Ilkorur, Santa Clara, CA (US); Peter C. Hrudey, San Mateo, CA (US); Gokhan Hatipoglu, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 216 days.

(21) Appl. No.: 17/981,230

(22) Filed: Nov. 4, 2022

(65) Prior Publication Data

US 2023/0171532 A1 Jun. 1, 2023

Related U.S. Application Data

(60) Provisional application No. 63/283,938, filed on Nov. 29, 2021.

(51) Int. Cl.
*H04R 1/22* (2006.01)
*G10K 11/18* (2006.01)

(52) U.S. Cl.
CPC .............. *H04R 1/22* (2013.01); *G10K 11/18* (2013.01)

(58) Field of Classification Search
CPC ...... H04R 1/22; H04R 1/2823; H04R 1/2846; H04R 1/1008; H04R 1/1016; G10K 11/18; F16K 99/0055; F16K 99/0042; F16K 99/0011
See application file for complete search history.

(56) References Cited

U.S. PATENT DOCUMENTS

| | | |
|---|---|---|
| 7,563,614 B2 | 7/2009 | Orwar et al. |
| 9,208,769 B2 | 12/2015 | Azmi |
| 10,376,841 B2 | 8/2019 | Shin et al. |
| 10,710,078 B2 | 7/2020 | Merten et al. |
| 10,869,141 B2 | 12/2020 | Albahri et al. |
| 11,260,391 B2 | 3/2022 | Banerjee et al. |
| 2004/0213982 A1 | 10/2004 | Touzov |
| 2005/0009101 A1 | 1/2005 | Blackburn |
| 2013/0153797 A1* | 6/2013 | Puleo .................... F04B 19/006 251/12 |
| 2015/0167863 A1 | 6/2015 | Mescher et al. |
| 2016/0045654 A1 | 2/2016 | Connor |
| 2016/0150310 A1* | 5/2016 | Bakalos ............... H04R 1/1041 381/372 |
| 2018/0376264 A1 | 12/2018 | Roeck et al. |
| 2019/0320272 A1* | 10/2019 | Jones ................... H04R 25/604 |

(Continued)

FOREIGN PATENT DOCUMENTS

WO 2018199966 A1 11/2018

OTHER PUBLICATIONS

Dutch patent No. 2033618, "Dutch Search Report" mailed Nov. 3, 2023, 14 pages.

*Primary Examiner* — Jason R Kurr

(74) *Attorney, Agent, or Firm* — Aikin & Gallant, LLP

(57) ABSTRACT

A portable electronic device comprising: an enclosure having an enclosure wall that defines a first chamber, a second chamber and an acoustic opening from the first chamber or the second chamber; and an electroosmotic flow valve operable to open and close the acoustic opening.

26 Claims, 10 Drawing Sheets

(56) References Cited

U.S. PATENT DOCUMENTS

| | | | |
|---|---|---|---|
| 2020/0260197 A1* | 8/2020 | Thomsen | H04R 25/48 |
| 2022/0126298 A1 | 4/2022 | Hill et al. | |
| 2022/0256280 A1* | 8/2022 | Kuipers | H04R 1/1016 |
| 2023/0048436 A1* | 2/2023 | Sadoshima | H04R 1/1016 |

* cited by examiner

ELECTROOSMOTIC FLOW VALVE FOR AN ELECTRONIC DEVICE

CROSS-REFERENCE TO RELATED APPLICATIONS

The application is a non-provisional application of co-pending U.S. Provisional Patent Application No. 63/283,938, filed Nov. 29, 2021 and incorporated herein by reference.

FIELD

An aspect of the disclosure is directed to an acoustic valve driven by electroosmotic flow of a fluid for an electronic device. Other aspects are also described and claimed.

BACKGROUND

Portable communications or listening devices (e.g., smart phones, earphones, etc.) have within them one or more transducers that convert an input electrical audio signal into a sound pressure wave output that can be heard by the user, or a sound pressure wave input into an electrical audio signal. The transducer (e.g., a speaker) can be used to, for example, output sound pressure waves corresponding to the voice of a far end user, such as during a telephone call, or to output sound pressure waves corresponding to sounds associated with a game or music the user wishes to play. Due to the relatively low profile of the portable devices, the transducers also have a relatively low profile, which in turn, can make it difficult to maintain optimal sound quality. In addition, in the case of listening devices such as in-ear hearing devices or earbuds, the devices extend into the ear canal to achieve better performance, however, can often have an improper, or in some cases undesirable, seal between the portable listening device and the ear canal, causing the user to experience lower quality sound.

SUMMARY

An aspect of the disclosure is directed to an electroosmotic flow actuator or valve assembly that can be used to, for example, control an amount of leak to/from cavities or chambers of an electronic device for improved acoustic performance. Representatively, in the case of in-ear hearing devices (e.g., earphones), in some cases a perfect seal (high acoustic impedance) is desired, whereas in other cases a very open path (low acoustic impedance) is desired. Representatively, in some cases, where the hearing device fits relatively tightly within the ear and forms a seal with the ear canal, or at least a partial seal, user's may experience an undesirable occlusion effect. For example, during active noise control (ANC) or noise cancellation, the user may want the in-ear hearing device to be isolated with passive isolation and ANC (closed valve) but when outdoors it may be desirable for transparency (open valve) so there is a more natural and lower occlusion effect when speaking. The valve therefore allows for the amount of leak to be dynamically controlled during system operation depending on the desired level of leak, and with lower power consumption. In still further aspects, the electroosmotic actuator may be used for other applications, for example, the actuator may be used for acoustic circuit changes, opening/closing of resonator(s) and narrow band frequency boots by acoustic short circuits. In still further aspects, the actuator may serve as a motor or driver for other mechanisms combined at micro and/or macro scale levels. For example, the actuator could be used to drive or actuate sliding mechanisms and/or in connection with displacement amplifiers (e.g., 10×-20× gain).

Representatively, in one aspect, the disclosure is directed to an acoustic valve that operates based on electroosmotic flow (EOF) principals using a bulk fluid. In some aspects, the bulk fluid flow forces may be used to actuate (open/close) the valve depending on the applied electrical voltage or electrical field. By way of background, EOF is the result of a tangentially applied electric field on a channel with the presence of an electrical double layer (EDL) and electroosmotic (EO) membrane. EOF differs from laminar flow in that the driving force is not a pressure gradient, but an externally applied electrical field. This results in a direct electrokinetic actuation of the fluid and may essentially be considered a solid state bi-directional pump. Suitable fluids used for actuation may include, but are not limited to, deionized (DI) water, common alcohols, and in some cases ferrofluids may be suitable. In some aspects, the EO membrane may be an alumina or polymer membrane. Returning now to the valve, the valve may have a very thin stack up thickness such that it may be considered a micro valve and be suitable for use in connection with relatively small devices. Representatively, in some aspects, the valve may include a piston that is displaced within guides between open and closed positions or states, and sealed to avoid leakage of the bulk fluid. The piston may be coupled to the components making up the pump assembly that is used to drive the displacement of the piston. In some aspects, the electroosmotic pump assembly may be formed by a stack up of materials including a printed circuit board (PCB) layer, an electrode layer, an electroosmotic membrane, a reservoir holding the bulk fluid and a fluid pathway through the pump to the piston. In other aspects, where microfabrication or microelectromechanical systems (MEMS) techniques are used to form the assembly, the stack up may be made of layers of MEMS materials (e.g., silicon, polymers, metals, ceramics, etc.) using MEMS processing techniques. In this aspect, the components making up the assembly may be between 1 and 100 micrometers in size and/or the assembly may range in size from 20 micrometers to a millimeter. In the open state, the piston may rest on the stack up of pump components (e.g., held by a vacuum), and may be positioned below an acoustic vent or opening. In some aspects, the vent or opening may include a plurality of tubes or pores that connect external ambient air to a front volume chamber of an in-ear earphone, which may also be coupled to the ear canal (e.g., an acoustic opening or port to the ear canal). In the closed state, the piston is raised up by changing the applied voltage, and seals off the plurality of tubes, thus breaking the communication between ambient air and the ear canal.

Representatively, in one aspect, the disclosure is directed to a portable electronic device including an enclosure having an enclosure wall that defines a first chamber, a second chamber and an acoustic opening from the first chamber or the second chamber; and an electroosmotic flow valve operable to open and close the acoustic opening. In some aspects, the electroosmotic flow valve includes a driven member and an electroosmostic pump having a fluid that is actuated by an applied electrical field to drive the driven member to open and close the acoustic opening. In some aspects, the driven member includes a piston positioned between the acoustic opening and a fluid pathway of the electroosmotic pump through which the fluid flows once actuated to move the piston between a closed position in which the piston closes the acoustic opening and an open position in which the piston opens the acoustic opening. In some aspects, the driven member includes a compliant membrane aligned with the acoustic opening and sealed to a fluid pathway of the electroosmotic pump through which the fluid flows once actuated to move the compliant membrane between a closed position in which the compliant membrane closes the acoustic opening and an open position in which the piston opens the acoustic opening. In some aspects, the driven member further includes a piston aligned with the acoustic opening and coupled to the compliant membrane. In some aspects, the electroosmotic pump includes an electroosmotic membrane positioned between a first electrode coupled to a first printed circuit board and a second electrode coupled to a second printed circuit board, a fluid reservoir coupled to the second printed circuit board and a fluid pathway through the electroosmotic pump. In some aspects, the electroosmotic membrane is a first electroosmotic membrane and the fluid reservoir is a first fluid reservoir, the electroosmotic pump further comprises a second electroosmotic membrane positioned between a third electrode coupled to a third printed circuit board and a fourth electrode coupled to a fourth printed circuit board, and a second fluid reservoir coupled to the fourth printed circuit board and the fluid pathway through the electroosmotic pump. In some aspects, the electroosmotic membrane includes a plurality of pores defining a portion of the fluid pathway. In some aspects, at least one pore of the plurality of pores comprises a sidewall having an arrangement of recessed regions each having a depth and a height. In some aspects, the portable electronic device comprises an in-ear earphone, the first chamber is a front volume chamber of the in-ear earphone and the acoustic opening is an acoustic vent from the front volume chamber to an ambient environment surrounding the enclosure. In some aspects, the enclosure wall defines a Helmholtz Resonator having a neck portion comprising the first chamber and a body portion comprising the second chamber.

In still further aspects, the disclosure is directed to a portable electronic device including an enclosure comprising an enclosure wall defining an interior chamber and an acoustic opening from the interior chamber; a transducer positioned within the interior chamber and dividing the interior chamber into a first chamber comprising a first side of the transducer and the acoustic opening and a second chamber comprising a second side of the transducer; and an electroosmotic flow valve operable to open and close a vent to the first chamber or the second chamber. In some aspects, the electroosmotic flow valve includes a piston coupled to an electroosmotic pump having a fluid pathway, and wherein a fluid flows through the fluid pathway upon application of an electrical field to move the piston between a closed position in which the piston closes the vent and an open position in which the piston opens the vent. In some aspects, a compliant membrane is coupled to the piston and the fluid pathway to seal the fluid flowing through the fluid pathway within the electroosmotic pump. In some aspects, an electroosmotic flow valve includes a compliant membrane sealed to an electroosmotic pump having a fluid pathway, and wherein a fluid flows through the fluid pathway upon application of an electrical field to move the piston between a closed position in which the piston closes the vent and an open position in which the piston opens the vent. In some aspects, the vent is between the first chamber and the second chamber. In some aspects, the electroosmotic flow valve comprises a driven member driven by an electroosmotic pump to open and close the vent, and the electroosmotic pump comprising: a first printed circuit board; a first electrode coupled to the first printed circuit board; an electroosmotic membrane coupled to the first electrode; a second electrode coupled to the electroosmotic membrane; a second printed circuit board coupled to the second electrode; and a fluid reservoir for containing the fluid and coupled to the second printed circuit board and a fluid pathway through the electroosmotic pump. In some aspects, the electroosmotic membrane includes a plurality of pores of different sizes defining a portion of the fluid pathway.

In still further aspects, the disclosure is directed to an electroosmotic actuator assembly including a driven member operable to transition between a first position and a second position; and a driving member operable to drive the transition of the driven member using an electroosmotic flow of a fluid, the driving member comprising: an electroosmotic membrane; a first electrode coupled to a first side of the electroosmotic membrane; a second electrode coupled to a second side of the electroosmotic membrane; a fluid reservoir for containing the fluid; and a fluid pathway extending through the driving member from the fluid reservoir to the driven member. In some aspects, the driving member further comprises: a first printed circuit board coupled to the first electrode; and a second printed circuit board coupled to the second electrode, and wherein the fluid reservoir is coupled to the second printed circuit board. In some aspects, the driving member is a first driving member stack up, and the electroosmotic actuator assembly comprises a second driving member stack up coupled to the first driving member stack up, and wherein the second driving member stack up comprises: an electroosmotic membrane; a first electrode coupled to a first side of the electroosmotic membrane; a second electrode coupled to a second side of the electroosmotic membrane; a fluid reservoir for containing the fluid; and a fluid pathway fluidly coupling the fluid reservoir of the second driving member stack up to the fluid pathway of the first driving member stack up. In some aspects, the fluid pathway of the electroosmotic membrane of the first driving member stack up comprises a number of pores having a different size than a number of pores of the fluid pathway of the electroosmotic membrane of the second driving member assembly. In some aspects, the fluid pathway includes a number of channels. In some aspects, each channel of the number of channels includes a scalloped sidewall. In some aspects, each channel of the number of channels comprise a sidewall and a self-assembled monolayer of hydrophobic chemical coupled to the sidewall. In some aspects, the electroosmotic actuator assembly is an electroosmotic flow valve, and the driven member transitions between the first position and the second position to open or close an acoustic opening of an electronic device within which the electroosmotic actuator assembly is integrated. In some aspects, the driven member forms a sidewall of a transmission line of an acoustic chamber of a speaker and the transition of the driven member is operable to modify a resonance frequency of the speaker. In some aspects, the electroosmotic actuator assembly is an electroosmotic motor.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect in this disclosure are not necessarily to the same aspect, and they mean at least one.

DETAILED DESCRIPTION

In this section we shall explain several preferred aspects of this disclosure with reference to the appended drawings. Whenever the shapes, relative positions and other aspects of the parts described are not clearly defined, the scope of the disclosure is not limited only to the parts shown, which are meant merely for the purpose of illustration. Also, while numerous details are set forth, it is understood that some aspects of the disclosure may be practiced without these details. In other instances, well-known structures and techniques have not been shown in detail so as not to obscure the understanding of this description.

The terminology used herein is for the purpose of describing particular aspects only and is not intended to be limiting of the disclosure. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 1:
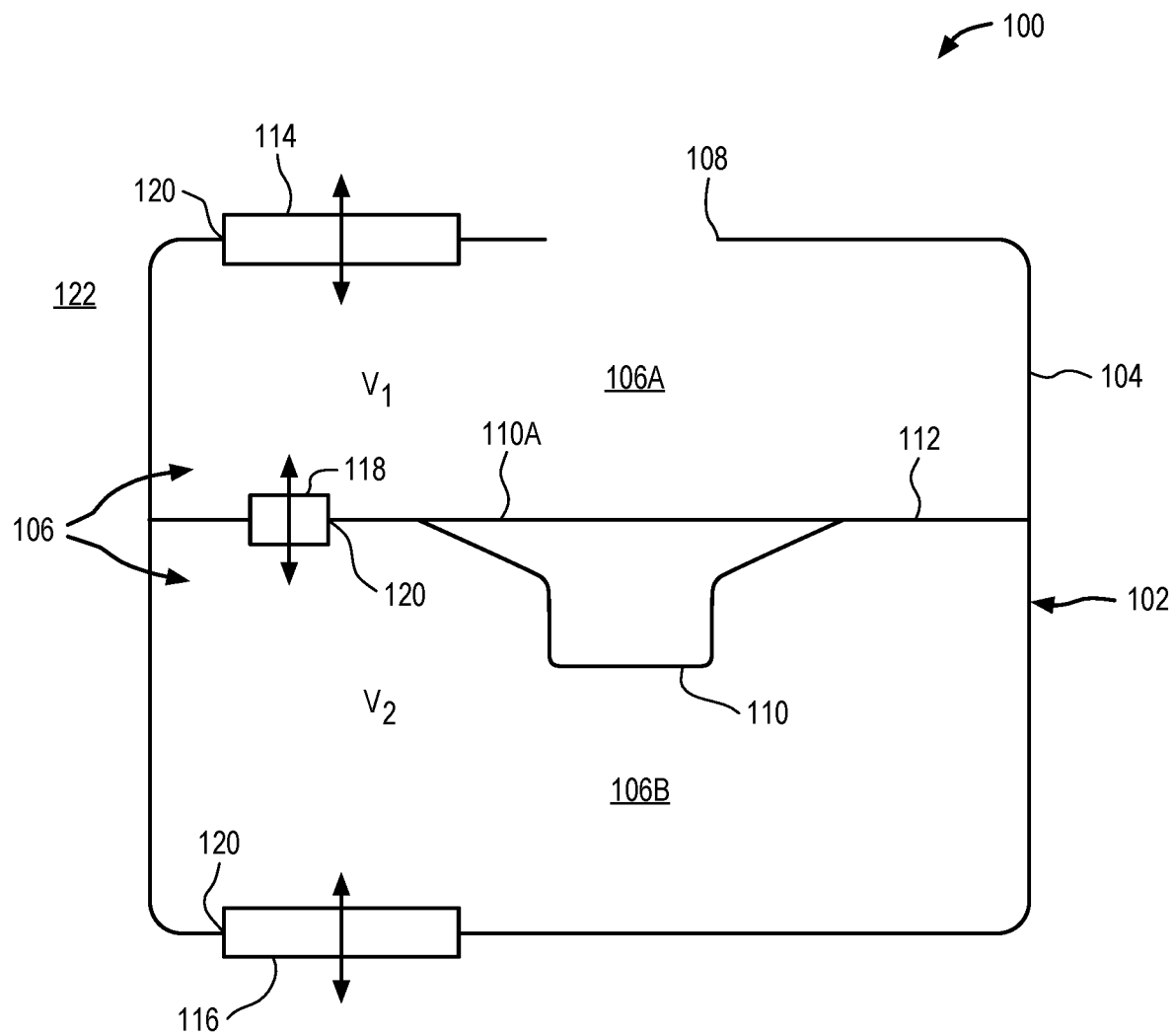
FIG. 1 illustrates a cross-sectional side view of one aspect of a portable electronic device having a valve.

FIG. 1 illustrates a cross-sectional side view of one aspect of a valve assembly for a transducer positioned within a portable electronic device. The electronic device 100 may include a housing, casing or outer enclosure 102 that defines or closes off a chamber in which the constituent electronic components of electronic device 100 are contained. In some aspects, it is contemplated that device 100 may be a portable or mobile communications device, an in-ear device, portable time piece or any other device within which a transducer may be implemented. Enclosure 102 may include an enclosure wall 104 that separates a surrounding environment 122 from an encased space or interior chamber 106 formed within enclosure 102. In some cases, the enclosure wall 104 completely isolates or seals the entire, or a portion of, interior chamber 106 from the surrounding environment 122. For example, the enclosure wall 104 may form a water-proof or acoustically isolated portion of interior chamber 106 which is impermeable to water and/or air. The interior chamber 106 may be of a sufficient volume and/or size to accommodate the constituent components of electronic device 100. The enclosure wall 104 may also include one or more of an acoustic opening or port 108. The acoustic opening or port 108 may be, for example, a sound output port through which sound from a speaker positioned within interior chamber 106 may be output. In other aspects, where a microphone is positioned near enclosure acoustic port 108, it could be a sound input port to allow for input of sound to the microphone.

Representatively, in one aspect shown in FIG. 1, enclosure acoustic port 108 is an acoustic port that is acoustically open to a transducer 110 positioned within interior chamber 106. In some aspects, transducer 110 may be any type of electroacoustic transducer capable of converting an electrical audio signal into a sound or a sound into an electrical audio signal. Representatively, transducer 110 may be a speaker or a micro-speaker, for example, a miniaturized version of a loudspeaker that uses a moving coil motor to drive sound output. Thus, in some aspects, transducer 110 may be referred to herein as a micro-speaker. In other aspects, where transducer 110 converts sound into an electrical audio signal, it may further be referred to herein as a microphone. In some aspects, transducer 110 may be coupled to an interior wall 112 and be considered to divide interior chamber 106 into a front volume chamber 106A and a back volume chamber 106B around transducer 110. In the case where transducer 110 is a speaker, front volume chamber 106A may form a chamber having a first volume (V1) around the sound output face or surface 110A of transducer 110. The front volume chamber 106A (and first volume V1) may be considered acoustically coupled to, or otherwise open to, acoustic port 108. In this aspect, sound pressure waves output from surface 110A of transducer 110 may pass through front volume chamber 106A and out to the surrounding ambient environment 122 through acoustic port 108. Back volume chamber 106B may have a second volume (V2) and surround the back side of transducer 110 (e.g., the side of transducer 110 opposite surface 110A).

It is recognized that, for example, a size, volume, pressure or other aspects of front volume chamber 106A or back volume chamber 106B may impact the acoustic performance of transducer 110. Thus, modifying the size, volume and/or pressure of front volume chamber 106A and/or back volume chamber 106B may be used to tune the acoustic performance of transducer 110. For example, in some cases, it may be desirable for front volume chamber 106A and/or back volume chamber 106B to be isolated or sealed (e.g., high acoustic impedance) from the ambient environment 122 to achieve the desired acoustic performance. In other cases, it may be desirable for front volume chamber 106A and/or back volume chamber 106B to have a very open path (e.g., low acoustic impedance) and have some amount of leak to the surrounding ambient environment 122. In still further aspects, it may be desirable for front volume chamber 106A to have a leak, or otherwise be open to, back volume chamber 106B.

With this in mind, valve assemblies or valve(s) 114, 116 and/or 118 may further be provided to vent an associated chamber. Valve 114, 116, and/or 118 may open and/or close a vent or opening 120 from front volume chamber 106A and/or back volume chamber 106B to the ambient environment 122, or a vent or opening 120 between front and back volume chambers 106A-B. Representatively, valve 114 may open and/or close opening 120 formed through wall 104 between front volume chamber 106A and ambient environment 122. In other words, when valve 114 is open, front volume chamber 106A can leak or vent to ambient environment 122 and when valve 114 is closed, the leak or venting is prevented. A leak or venting may be desired from front volume chamber 106A where, for example, device 100 is an in-ear earpiece sealed within the user's ear but a more open feel is desired. Valve 116 may open and/or close opening 120 through wall 104 between back volume chamber 106B and ambient environment 122. In other words, when valve 116 is open, back volume chamber 106B can leak or vent to ambient environment 122, and when valve 116 is closed, the leak or venting is prevented. Valve 118 may open and/or close opening 120 through wall 112 between front volume chamber 106A and back volume chamber 106B. In this aspect, when valve 118 is open, front volume chamber 106A can leak or vent to back volume chamber 106B, and when valve 118 is closed, the leak or vent is prevented. In still further aspects, it is contemplated that one or more of valves 114, 116, 118 could be used to open and/or close an opening (e.g., opening 120) which is to another type of acoustic chamber, for example, an opening to an acoustic resonator or attenuator coupled to one or more of the previously discussed chambers or ports of the transducer.

In one aspect, one or more of valves 114, 116, 118 may be electromechanical valves that open and/or close in response to the application of a voltage. In this aspect, valves 114, 116, 118 may be dynamically actuated to control the amount of leak. In some aspects, one or more of valves 114, 116, 118 may be electroosmotic flow actuators or valves. Valves 114, 116, 118 may be the same, or may be different. In some aspects, one or more of valves may offer the advantages of bistability, low power consumption switching from on/off states, digitization for controlling a percentage or amount of open area for venting, and/or silent operation. A number of representative configurations for valves 114, 116, 118 will now be described in reference to FIG. 2 to FIG. 18.

Figure 2:
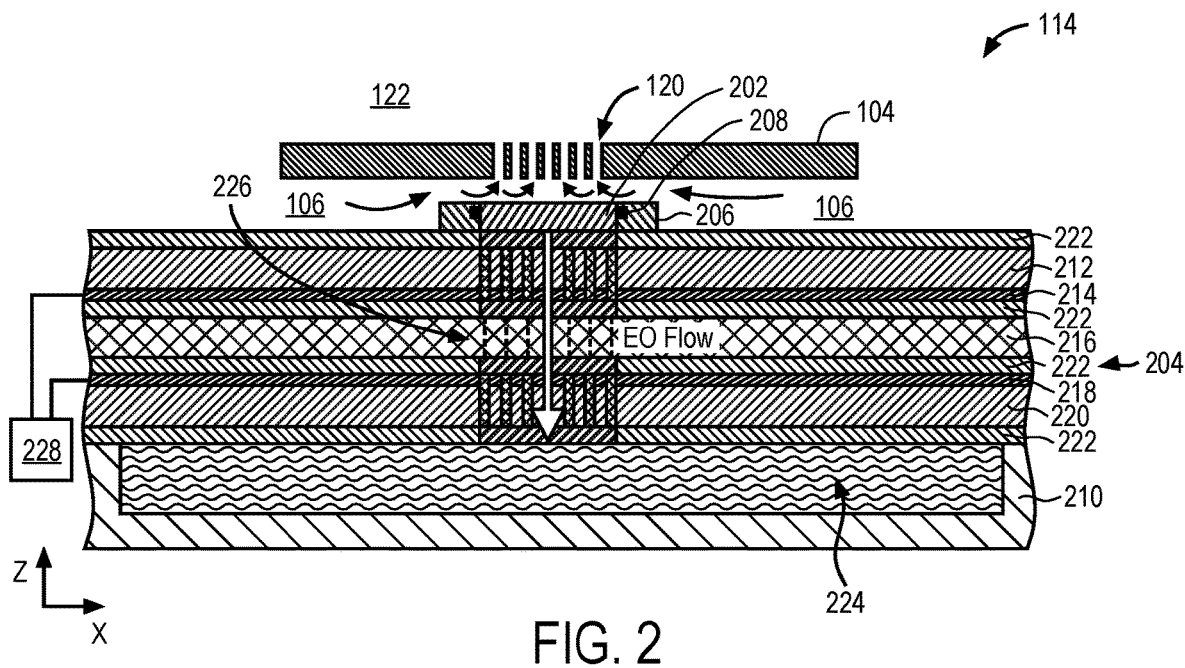
FIG. 2 illustrates an exploded cross-sectional side view of a valve of the portable electronic device of FIG. 1 in an open configuration.
Figure 3:
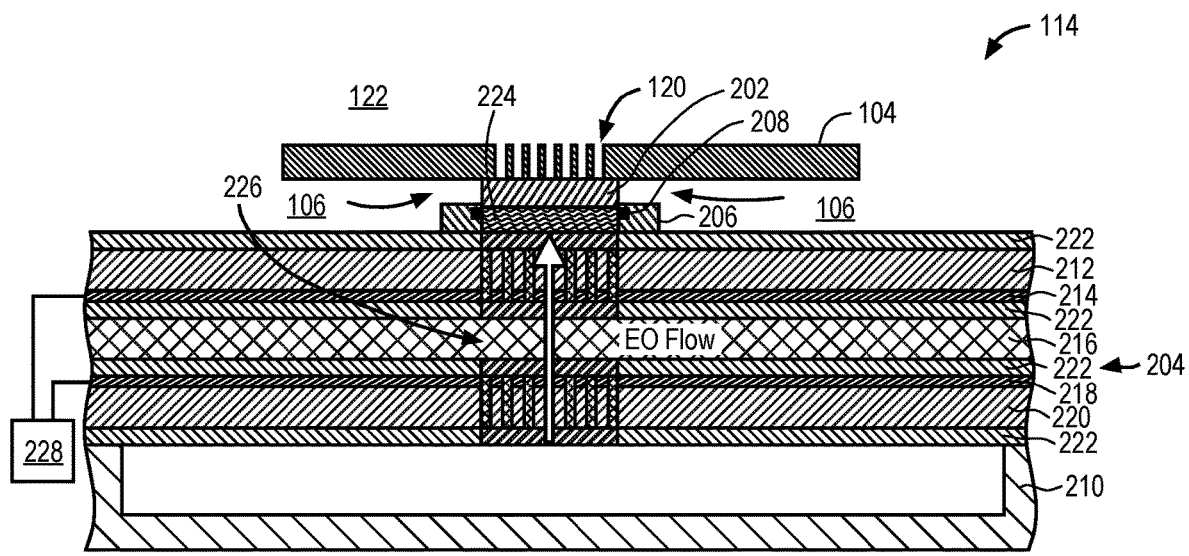
FIG. 3 illustrates an exploded cross-sectional side view of a valve of the portable electronic device of FIG. 1 in a closed configuration.

Representatively, FIG. 2 and FIG. 3 illustrate magnified cross-sectional side views of a representative valve from FIG. 1. In this aspect, FIG. 2 shows valve 114 used to open/close opening 120 formed in an enclosure wall (e.g., enclosure wall 104 of FIG. 1) in an open position (e.g., opening 120 is uncovered) while FIG. 3 shows valve 114 in a closed position (e.g., opening 120 is covered). It should be understood, however, that although valve 114 is specifically discussed, one or more of valves 116 and/or 118 may be the same as valve 114 such that the description provided herein also applies to any other valves disclosed in FIG. 1. From this view, it can be seen that valve 114 is made up of a driven member 202 that opens/closes opening 120 and a driving member 204 that drives or actuates the driven member 202 to open/close opening 120. The driven member 202 may have any size, shape and/or configuration suitable for covering opening 120 and preventing the passage of air, or uncovering opening 120 so that air may pass through opening 120. For example, in some aspects, opening 120 may be made up of a number of holes, pores or openings as shown. The driven member 202 may have a size suitable for covering/uncovering each of the holes, pores or openings making up opening 120. In some aspects, driven member 202 may be a piston which moves in a z-direction along a guide member 206 toward or away from opening 120 to close or open opening 120. Guide member 206 may be attached to a top side of the driving member 204 and have a size and shape suitable for guiding the piston toward and/or away from the opening 120. In addition, a sealing member 208 may be positioned in guide member 206 to seal the piston within guide member 206. In some aspects, sealing member 208 may be a dust or liquid seal such as an o-ring. The sealing member 208 may surround the guide member 206 and/or the driven member 202 to prevent fluids from leaking out of the driving member 204 to the chamber or cavity on the other side of the guide member 206.

Referring now in more detail to driving member 204, driving member 204 may be an electroosmotic pump that uses electroosmotic bulk flow fluid forces generated upon application of a voltage to drive the driven member 204. Representatively, driving member 204 may include a number of layers suitable for inducing a flow of fluid through a fluid pathway within the driving member 204 upon application of an electrical voltage. For example, in one aspect, driving member 204 may include a stack up made up of a substrate layer 212, a conductive layer 214, an electroosmotic membrane layer 216, another conductive layer 218, another substrate layer 220 and a reservoir 210. In some aspects, the stack up of layers may be formed by different material layers or components that are adhered together using an adhesive layer 222 as shown. In other aspects, the driving member stack up is formed using microfabrication or MEMS processing techniques and adhesive layers are omitted. A fluid pathway 226 is further formed through the stack up, from the reservoir 210 to the driven member 202. The fluid pathway 226 may be of any size and shape to allow the fluid 224 within reservoir 210 to flow between the reservoir 210 and the driven member 202 to drive the movement of the driven member 202. In some aspects, fluid pathway 226 may include a number of capillary paths connecting reservoir 210 to driven member 202. In some aspects, fluid pathway 226 may run in a direction parallel to the direction of movement of the driven member 202 (e.g., a z-direction).

Referring now in more detail to each of the pump components or layers, substrate layer 212 and/or substrate layer 220 may, in some aspects, be a printed circuit board (PCB) including conductive pathways or circuitry therein for providing electrical connections between different pump components or layers and an externally applied voltage. In some aspects, substrate layer 212 may be considered a first or top substrate (or PCB). Guide member 206 may be positioned or attached along the top side of substrate layer 212, for example by adhesive layer 222, so that driven member 202 may rest on substrate layer 212, below opening 120, when it is in the open position. Substrate layer 220 may be considered a second or bottom substrate (or PCB). The reservoir 210 may be attached to the bottom side of substrate layer 220, for example, by adhesive layer 222. Substrate layers 212, 220 may be made of any material or combination of materials operable to provide electrical pathways therein and/or otherwise used in forming a PCB.

Conductive layer 214 and conductive layer 218 may be attached to the substrate layer 212 and substrate layer 220. In some aspects, conductive layer 214 may be considered attached to a bottom side of substrate layer 212. Conductive layer 218 may be considered attached to a top side of substrate layer 220. Conductive layers 214, 218 may be considered electrodes or electrode layers that are attached to the substrate layers 212, 220 by adhesive 222. Conductive layers 214, 218 may be made of any material suitable for forming electrodes as described herein.

Electroosmotic membrane 216 is sandwiched between conductive layers 214, 218. For example, conductive layer 214 may be considered attached to a first or top side of electroosmotic membrane 216 and conductive layer 218 may be considered attached to a second or bottom side of electroosmotic membrane 216. Electroosmotic membrane 216 may be formed of any microporous material that can hold a charge. Representatively, electroosmotic membrane 216 may be a porous alumina or polymer membrane. In this aspect, electroosmotic membrane 216 serves as a channel between an electrical double layer (EDL) formed by the conductive layers 214, 218.

Reservoir 210 may be coupled to substrate layer 220, for example, using adhesive 222. Reservoir 210 may be of any size, shape and made of any material suitable for containing fluid 224 used to drive movement of the driven member 202. In some aspects, it is contemplated that reservoir 210 may be relatively rigid and made of a relatively stiff material to ensure the force that is generated by the electroosmotic pump is primarily imparted on the driven member 202. Fluid 224 may be any fluids suitable for driving movement of driven member 202 including, but not limited to, deionized (DI) water, common alcohols, and in some cases ferrofluids may be suitable. In some aspects, the amount of fluid 224 may be balanced against the size of the driven member 202 to determine the voltage necessary to drive driven member 202. Representatively, in some aspects, driven member 202 may be relatively small while the volume of fluid 224 contained in reservoir 210 may be relatively large so that the bulk fluid flow produces a larger diving force on driven member 202 with minimal voltage application.

FIG. 3 illustrates the same driven member 202 and driving member 204 as FIG. 2. In this view, driven member 202 is in the closed position in which it covers or otherwise closes opening 120. In particular, it can be seen that driven member 202 is pushed upward by the fluid 224 passing through the fluid pathway 226 in the direction of the arrow. The fluid 224 fills the space formed by guide member 206 and sealing member 208 below driven member 202 to hold driven member 202 in the closed position over opening 120. As long as the driving voltage is applied, fluid 224 continues to flow in the direction of the arrow and holds driven member 202 in the closed position. In still further aspects, reversing the electric charge will induce a reverse flow of the fluid 224 back toward reservoir 210. In some aspects, a vacuum force will further be present which causes driven member 202 to move away from the opening 120 to the open position shown in FIG. 2.

Representatively, to drive driven member 202, an applied voltage from circuitry 228 interacts with the net charge in the layer near the liquid/solid interface, resulting in a local net force that induces fluid 224 in the reservoir 210 to move up the fluid pathway 226 toward the driven member 202 in the direction of the arrow shown in FIG. 3. This results in a bulk fluid force that causes the driven member 202 to displace upward towards opening 120, effectively sealing off or closing the opening 120 as shown in FIG. 3. The valve assembly, and specifically driven member 202, may be considered in a first or closed position or configuration when driven member 202 is covering, sealing or closing opening 120 as shown in FIG. 3. In the absence of an applied voltage, fluid 224 travels through fluid pathway 226 down toward reservoir 210, or remains in reservoir 210, allowing driven member 202 to move back to the resting or open position shown in FIG. 2. The valve assembly, and specifically driven member 202, may be considered in second or an open position or configuration when driven member 202 is not covering or otherwise spaced a distance away from opening 120 so that opening 120 is open to volume 106 as shown in FIG. 2.

It is further contemplated that the electronics and/or circuitry 228 used to apply the voltage to the driving member 204 should be able to alter the polarization of the electrodes (e.g., conductive layers 214, 218) even in the case where the EO membrane 216 is substantially hydrophobic in order to achieve "powerless" resistance to back-pressure (e.g., some level of bistability). Representatively, the electronics and/or circuitry 228 should have the ability to produce a driving force that overcomes the surface energy of the hydrophobic EO membrane (e.g., EO membrane 216) and drives the fluid back to the reservoir.

Figure 4:
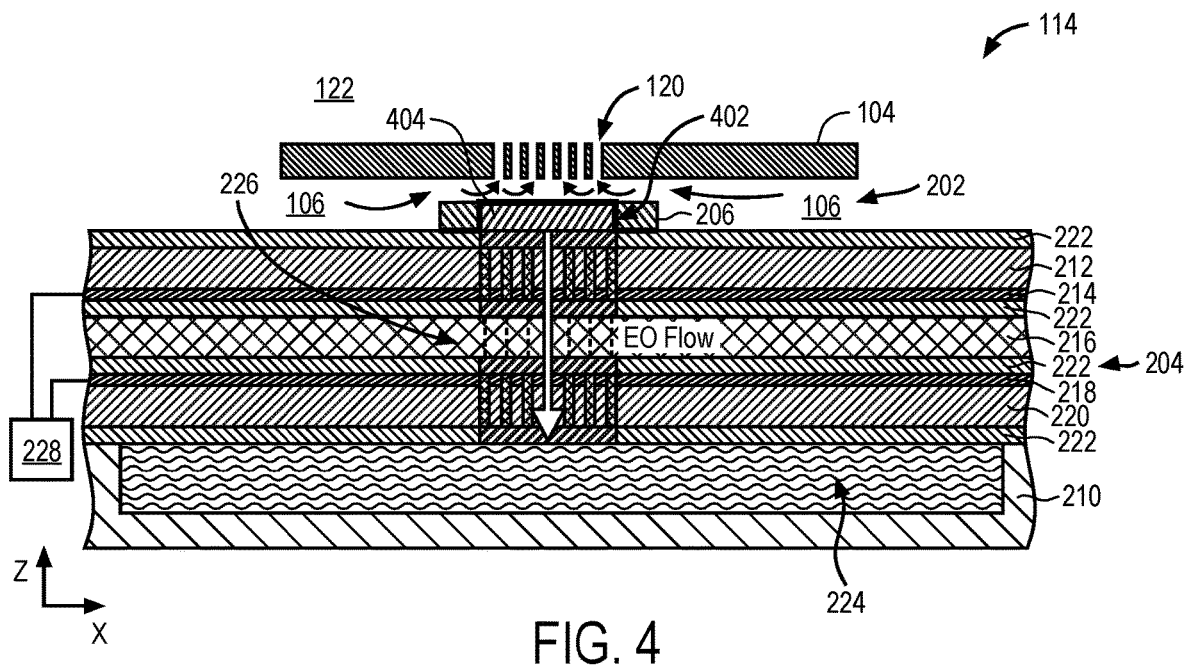
FIG. 4 illustrates an exploded cross-sectional side view of a valve of the portable electronic device of FIG. 1 in an open configuration.
Figure 5:
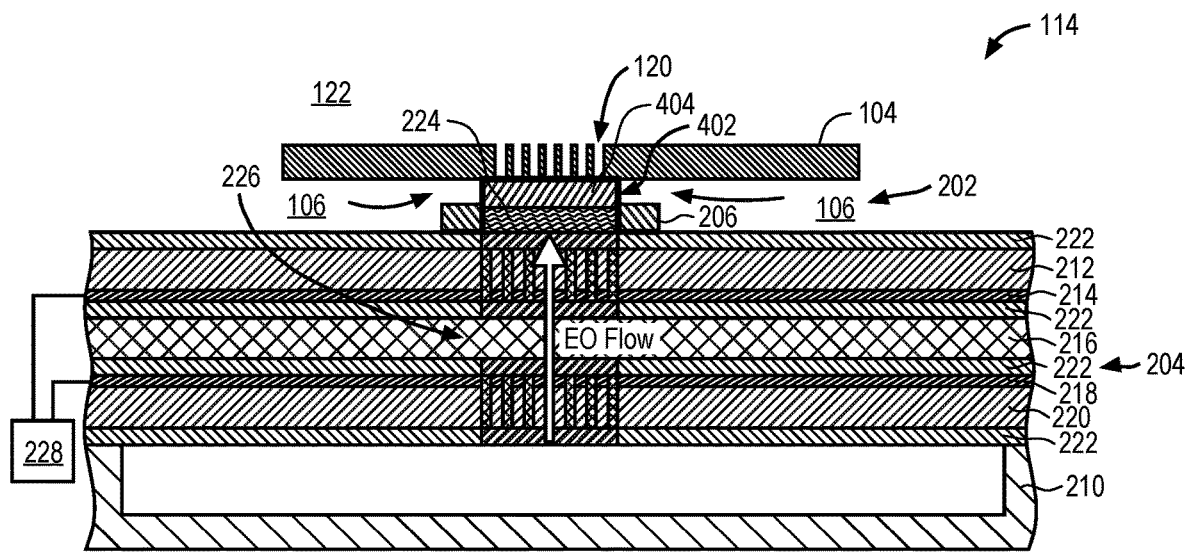
FIG. 5 illustrates an exploded cross-sectional side view of a valve of the portable electronic device of FIG. 1 in a closed configuration.

Referring now to FIG. 4 and FIG. 5, FIG. 4 and FIG. 5 illustrate magnified cross-sectional side views of a representative valve of FIG. 1. FIG. 4 shows valve 114 in an open position in which opening 120 is uncovered (or open) and FIG. 5 shows valve 114 in a closed position in which opening 120 is covered (or closed). Valve 114 shown in FIG. 4 and FIG. 5 is substantially the same as, and includes the same components and/or layers as, valve 114 described in reference to FIG. 2 and FIG. 3. In particular, valve 114 of FIG. 4 and FIG. 5 includes a driven member 202 and a driving member 204. Driven member 202 may include a piston 404 as previously discussed and driving member 204 may be an electroosmotic pump that uses electroosmotic bulk flow fluid forces generated upon application of a voltage to drive the driven member 202. Representatively, driving member 204 may include a stack up of layers suitable for inducing a flow of fluid through a fluid pathway within the driving member 204 upon application of an electrical voltage. For example, in one aspect, driving member 204 may include a stack up made up of a substrate layer 212, a conductive layer 214, an electroosmotic (EO) membrane layer 216, another conductive layer 218, another substrate layer 220 and a reservoir 210 for containing the bulk fluid 224 as previously discussed.

In FIG. 4 and FIG. 5, however, it can be seen that driven member 202 may further include a compliant membrane 402. Compliant membrane 402 may be positioned over piston 404 and sealed around its edges between guide member 206 and substrate layer 212. Compliant membrane 402 and piston 404 may be aligned with opening 120 so that movement in the z-direction opens/closes opening 120. In some aspects, compliant membrane 402 may encapsulate piston 404. Compliant membrane 402 may seal the fluid 224 within driving member 204 so it does not leak out from under or around piston 404 during operation. In this aspect, in configurations including a compliant membrane 402, the previously discussed sealing member (e.g., o-ring) within guide member 206 may be omitted. In addition to preventing leakage of fluid 224, compliant membrane 402 may provide a restoring force when piston 404 transitions from the closed to open state or position. For example, complaint membrane 402 may be attached to piston 404 and bias or push piston 404 toward the open position, in addition to the vacuum forces as previously discussed. In this aspect, the compliant membrane 402 will hold piston 404 in place so no charge is required after the transition, thus saving power. Compliant membrane 402 may be made of any compliant material suitable for sealing fluid 224 within driving member 204 and/or providing a restoring force to piston 404.

Figure 6:
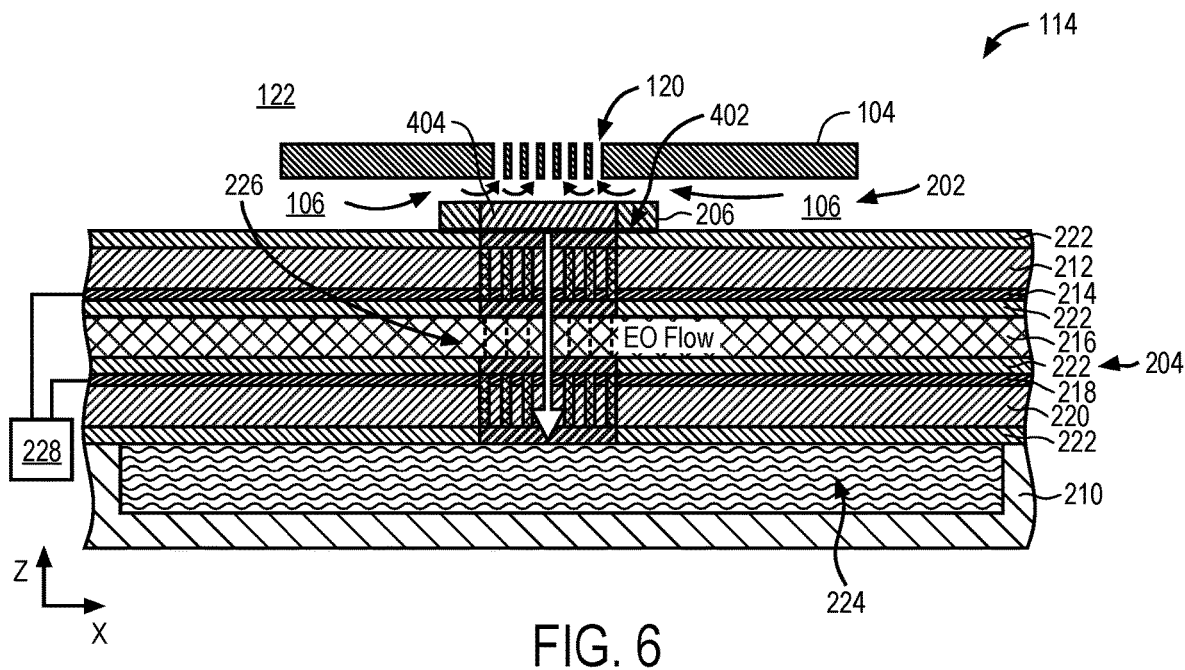
FIG. 6 illustrates an exploded cross-sectional side view of a valve of the portable electronic device of FIG. 1 in an open configuration.
Figure 7:
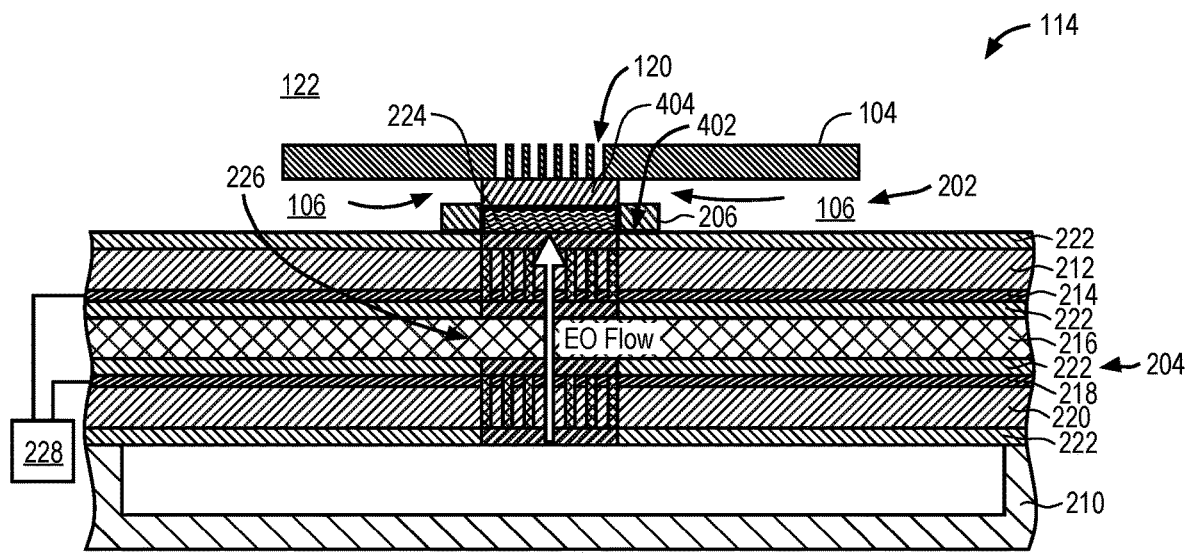
FIG. 7 illustrates an exploded cross-sectional side view of a valve of the portable electronic device of FIG. 1 in a closed configuration.

Referring now to FIG. 6 and FIG. 7, FIG. 6 and FIG. 7 illustrate magnified cross-sectional side views of a representative valve of FIG. 1. FIG. 6 shows valve 114 in an open position in which opening 120 is uncovered (or open) and FIG. 7 shows valve 114 in a closed position in which opening 120 is covered (or closed). Valve 114 shown in FIG. 6 and FIG. 7 is substantially the same as, and includes the same components and/or layers as, valve 114 described in reference to FIGS. 4-5. In particular, valve 114 of FIG. 6 and FIG. 7 includes a driven member 202 and a driving member 204. Driven member 202 may include a piston 404 and compliant membrane 402 as previously discussed and driving member 204 may be an electroosmotic pump that uses electroosmotic bulk flow fluid forces generated upon application of a voltage to drive the driven member 202. Representatively, driving member 204 may include a stack up of layers suitable for inducing a flow of fluid through a fluid pathway within the driving member 204 upon application of an electrical voltage. For example, in one aspect, driving member 204 may include a stack up made up of a substrate layer 212, a conductive layer 214, an electroosmotic membrane layer 216, another conductive layer 218, another substrate layer 220 and a reservoir 210 as previously discussed.

In this configuration, however, compliant membrane 402 may be positioned under piston 404 and sealed around its edges between guide member 206 and substrate layer 212. Compliant membrane 402 and piston 404 may be aligned with opening 120 so their movement in the z-direction opens/closes opening 120. Compliant membrane 402 may seal the fluid 224 within driving member 204 so it does not leak out from under or around piston 404 during operation. In this aspect, in configurations including a compliant membrane 402, the previously discussed sealing member (e.g., o-ring) within guide member 206 may be omitted. As can be seen from FIG. 6, when piston 404 is in the open position, compliant membrane 402 is a relatively flat membrane positioned between piston 404 and fluid pathway 226. Upon application of the voltage that drives the bulk fluid flow toward piston 404, fluid 224 pushes compliant membrane 402 upward and outward toward opening 120. This, in turn, pushes piston 404 toward opening 120 and covers or seals opening 120 as shown in FIG. 7. Since compliant membrane 402 is sealed between guide member 206 and substrate layer 212, fluid 224 is prevented from leaking out of driving member 204 by compliant membrane 402.

In addition to preventing leakage of fluid 224, compliant membrane 402 may provide a restoring force when piston 404 transitions from the closed to open state or position. For example, as previously discussed, reversing the electric charge in the system will induce reverse flow of the fluid 224, and the piston 404 will move inward via vacuum forces. Compliant membrane 402, which is attached to piston 404, may hold piston 404 in place so no charge is required after the transition, thus saving power. Compliant membrane 402 may be made of any compliant material suitable for sealing fluid 224 within driving member 204 and/or providing a restoring force to piston 404.

Figure 8:
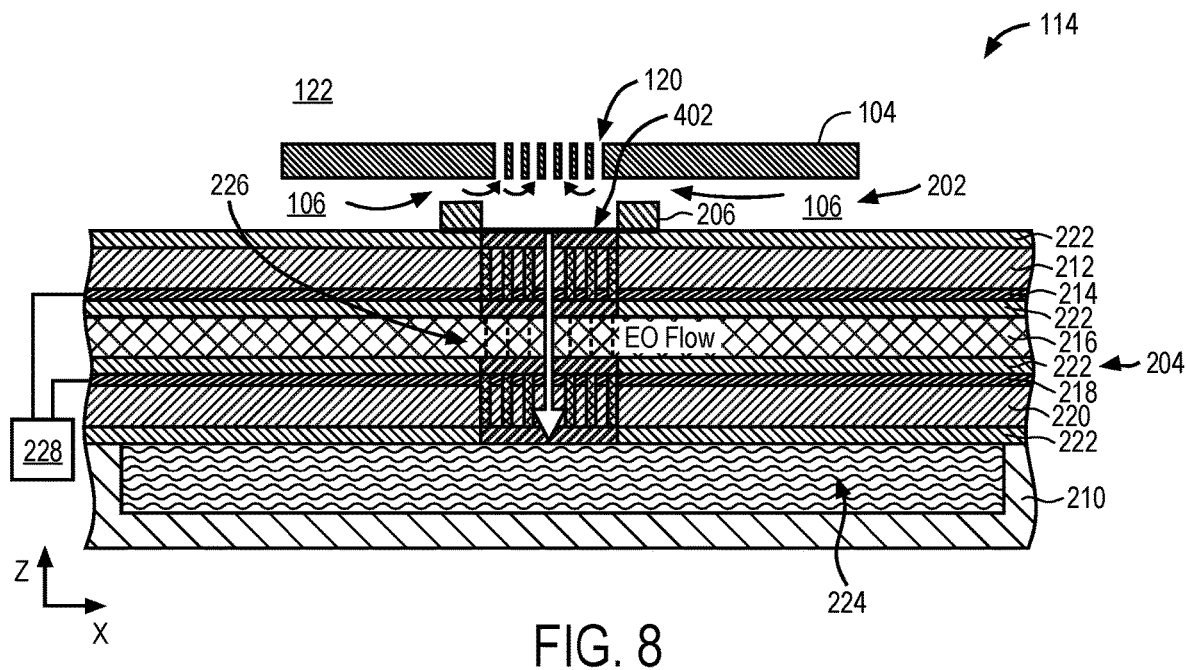
FIG. 8 illustrates an exploded cross-sectional side view of a valve of the portable electronic device of FIG. 1 in an open configuration.
Figure 9:
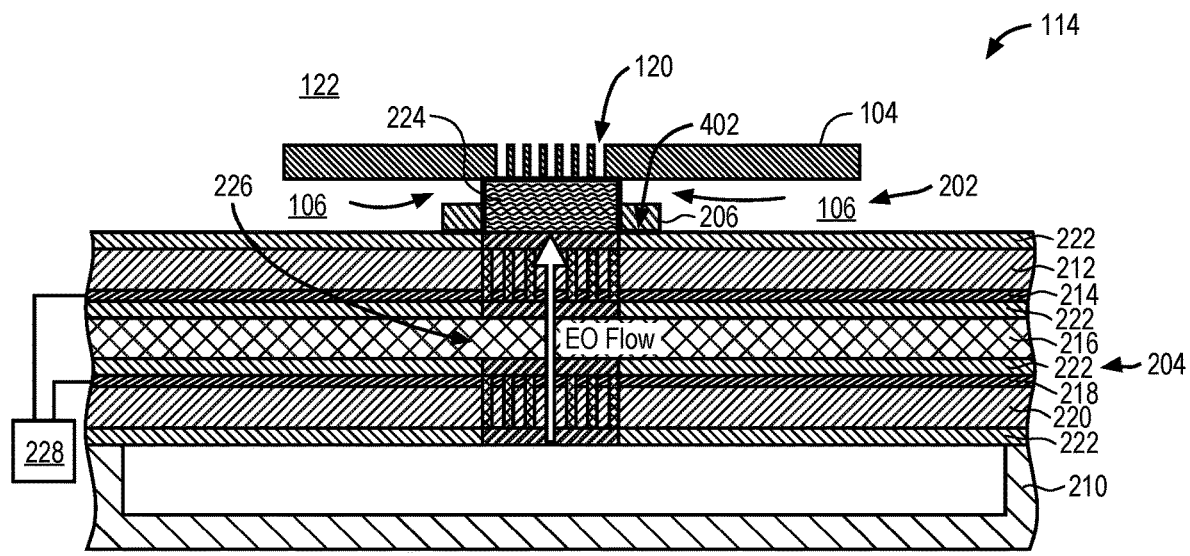
FIG. 9 illustrates an exploded cross-sectional side view of a valve of the portable electronic device of FIG. 1 in a closed configuration.

Referring now to FIG. 8 and FIG. 9, FIG. 8 and FIG. 9 illustrate magnified cross-sectional side views of a representative valve of FIG. 1. FIG. 8 shows valve 114 in an open position in which opening 120 is uncovered (or open) and FIG. 9 shows valve 114 in a closed position in which opening 120 is covered (or closed). Valve 114 shown in FIG. 8 and FIG. 9 is substantially the same as, and includes the same components and/or layers as, valve 114 described in reference to FIGS. 4-7. In particular, valve 114 of FIG. 8 and FIG. 9 includes a driven member 202 and a driving member 204. In this aspect, however, driven member 202 includes a compliant membrane 402 and the previously discussed piston is omitted. Driving member 204 may be an electroosmotic pump that uses electroosmotic bulk flow fluid forces generated upon application of a voltage to drive the driven member 202 as previously discussed. Representatively, driving member 204 may include a stack up of layers suitable for inducing a flow of fluid through a fluid pathway within the driving member 204 upon application of an electrical voltage. For example, in one aspect, driving member 204 may include a stack up made up of a substrate layer 212, a conductive layer 214, an electroosmotic membrane layer 216, another conductive layer 218, another substrate layer 220 and a reservoir 210 as previously discussed.

As previously discussed, in this configuration, compliant membrane 402 is used without a piston. Compliant membrane 402 alone therefore serves as the structure to either cover (close) or uncover (open) opening 120. Compliant membrane 402 is sealed around its edges between guide member 206 and substrate layer 212. Compliant membrane 402 may seal the fluid 224 within driving member 204 so it does not leak out from under or around piston 404 during operation. In this aspect, in configurations including a compliant membrane 402, the previously discussed sealing member (e.g., o-ring) within guide member 206 may be omitted. As can be seen from FIG. 8, when driven member 202 is in the open position, compliant membrane 402 is a relatively flat membrane positioned over fluid pathway 226. Upon application of the voltage that drives the bulk fluid flow toward compliant membrane 402, fluid 224 pushes compliant membrane 402 upward and outward toward opening 120. This, in turn, covers or seals opening 120 as shown in FIG. 9. Since compliant membrane 402 is sealed between guide member 206 and substrate layer 212, fluid 224 is prevented from leaking out of driving member 204 by compliant membrane 402.

In addition to preventing leakage of fluid 224, compliant membrane 402 may provide a restoring force that restores the compliant membrane 402 from the closed to open state or position. For example, as previously discussed, reversing the electric charge in the system will induce reverse flow of the fluid 224 and the inward via vacuum forces along with the natural bias of the compliant membrane 402 toward the open position, will pull compliant membrane 402 toward fluid pathway 226 to open or uncover opening 120. Compliant membrane 402 may be made of any compliant material suitable for sealing fluid 224 within driving member 204 yet rigid enough to seal or cover opening 120 when in the closed position.

In some aspects, driving member 204 is formed as a stack up of layers or components that are separately formed and assembled together (e.g., using an adhesive) to form an electroosmotic pump for driving the driven member 202. In other aspects, driving member 204 may be formed using MEMS or other microfabrication processing techniques that include depositing material layers, patterning and/or etching to form the desired material layers and structures (e.g., substrate layers, conductive layers, EO membrane layers, etc.). The use of MEMS or microfabrication processing techniques may allow for the formation of a micro sized valve for use in relatively compact or low z-height devices. MEMS or microfabrication processing techniques may also be used to form micro sized fluid pathways and/or pores through driving member 204 of specific shapes and sizes to optimize bulk fluid flow through driving member 204.

Representatively, in some aspects, a MEMS processing technique including deep reactive-ion etching (DRIE) silicon etching may be used to define an electroosmotic membrane layer (e.g., EO membrane 216) with pore or channels of a particular size and shape. In still further aspects, DRIE silicon etching may be used to form an EO membrane layer with a range of specific pore size openings. In still further aspects, post-DRIE processing may be used to create EO membrane pores having smooth sidewalls. In other aspects, DRIE processing may be used to create pore sidewalls with a designed depth of scalloping to achieve a particular hydrophobicity to the pore sidewalls. Still further, post-DRIE processing may be used to enhance the hydrophobicity of the pore sidewall by applying a self-assembled monolayer of hydrophobic chemical (such as a fluorinated silane, etc.). Still further, MEMS processing may be used to create a stack of EO membranes with electrodes on either side of the membrane and reservoirs in between in order to create multiple stages to the pump (e.g., to reduce power consumption targets without negatively impacting the pressure produced by the EO drive). In some aspects, the pore sizes and arrangements may vary from layer to layer. Such a multiple stage pump may help to reduce power consumption targets without negatively impacting the pressure produced by the EO pump drive. For example, the multiple stage pump arrangement may help to reduce power consumption by creating a staged inhibition of fluid flow in the power off state due to back pressure from the valve membrane. In still further aspects, electrodes may be formed along the sidewalls of the pores to selectively reduce the surface energy of the pores in a given stage of the EO membrane stack (e.g., similar to electro-wetting).

Figure 10:
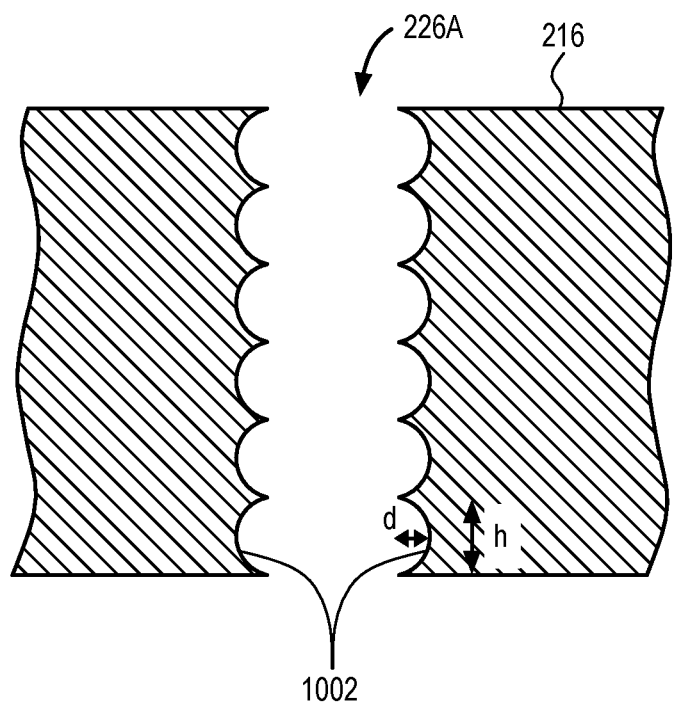
FIG. 10 illustrates an exploded cross-sectional side view of a fluid pathway of a valve of the portable electronic device of any one of FIGS. 1-9.

A number of representative fluid pathways and/or pore or channel arrangements that can be achieved using MEMS processing operations will now be described in reference to FIGS. 10-15. FIG. 10 illustrates a magnified cross-sectional side view of a representative fluid pathway, channel, opening or pore 226A. Fluid pathway, channel, opening or pore 226A may be one of a number of fluid pathways, openings or pores forming the fluid pathway 226 through EO membrane 216 as previously discussed in reference to FIGS. 2-9. EO membrane 216 may be an EO membrane such as the previously discussed EO membranes used to form driving member 204 previously discussed in reference to FIGS. 2-9. From this view, it can be seen that fluid pathway, opening or pore 226A is formed with sidewalls having a series, arrangement or pattern of recessed regions in the shape of scallops 1002. The scallops 1002 may have a particular depth (d) and height (h) selected so that the pore sidewalls have a desired hydrophobicity. Representatively, in some aspects, a DRIE processing technique (e.g., a Bosch process) may be used to form scallops 1002 of a desired depth (d) and height (h) to modify the trench zeta (Z) potential for microfluidic flow. It is further contemplated that although a scalloped sidewall configuration is shown, various configurations of the pore sidewall smoothness are possible to maximize electroosmotic pressure at minimum power.

Figure 11:
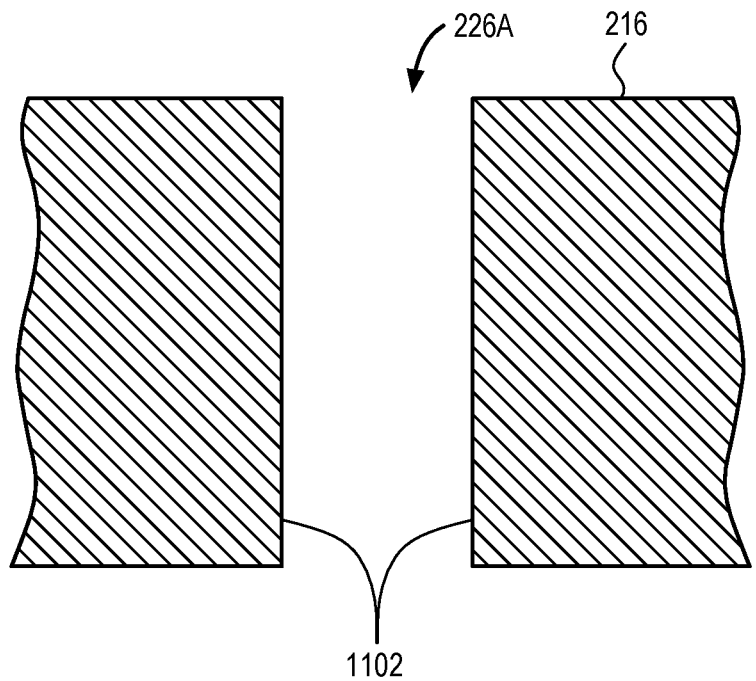
FIG. 11 illustrates an exploded cross-sectional side view of a fluid pathway of a valve of the portable electronic device of any one of FIGS. 1-9.

FIG. 11 illustrates a magnified cross-sectional side view of another representative fluid pathway, opening or pore 226A that may be one of a number of fluid pathways, openings or pores formed through EO membrane 216 as previously discussed in reference to FIGS. 2-9. EO membrane 216 may be an EO membrane such as the previously discussed EO membranes used to form driving member 204 previously discussed in reference to FIGS. 2-9. From this view, it can be seen that fluid pathway, opening or pore 226A is formed with smooth sidewalls 1102. Representatively, a post-DRIE processing technique may be used to create EO membrane pores having smooth sidewalls 1102 as shown. For example, in some aspects, silicon (Si) oxidation and then silicon dioxide (SiO2) wet etching and/or high temperature hydrogen (H2) annealing of Si to reflow Si may be used to form pores having smooth sidewalls. The smooth sidewalls 1102 may provide an alternative zeta (Z) potential value to that of the previously discussed scalloped sidewall.

Figure 12:
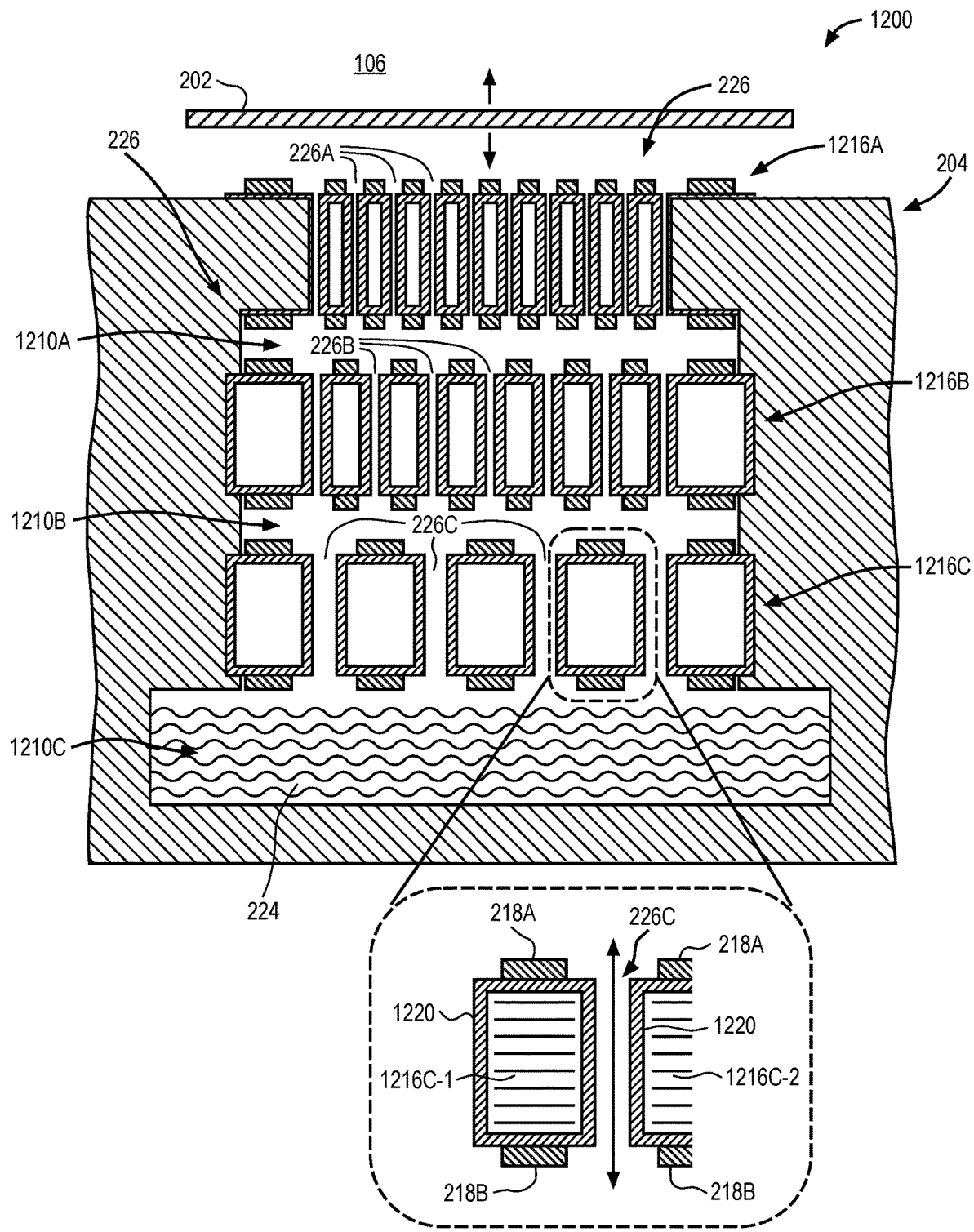
FIG. 12 illustrates an exploded cross-sectional side view of a valve of the portable electronic device of FIG. 1.

FIG. 12 illustrates a magnified cross-sectional side view of a representative stack up of EO membranes that may be used to form a driving member to open/close the valve as previously discussed. In some aspects, valve assembly 1200 may include a driving member 204 including a stack up of EO membranes formed by MEMS processing techniques that may be used to cause the driven member 202 to move in the direction of the arrows to open/close a desired opening (e.g., opening 120). In some aspects, the driven member 202 may be a compliant membrane as previously discussed. Assembly 1200 may further include EO membranes or layers 1216A, 1216B and 1216C. EO membranes or layers 1216A, 1216B, 1216C may be silicon layers formed using MEMS processing techniques. Each of EO membranes 1216A, 1216B and 1216C may be formed to include a number of fluid pathways, openings or pores 226A, 226B, 226C, respectively. The fluid pathways, openings or pores 226A, 226B, and/or 226C may, in some aspects, have different sized openings as shown. For example, the fluid pathways, opening or pores may increase in size from EO membrane 1216A to EO membrane 1216C. Representatively, pores 226A may have the smallest size (e.g., opening diameter), the sizes of pores 226B may be bigger than pores 226A, and the sizes of pores 226C may be bigger than pores 226B. In other aspects, the arrangement of pore sizes may be reversed such that pores 226C may have the smallest sizes while pores 226A have the largest sizes. In addition, the pores within each of EO membranes 1216A, 1216B, 1216C may be the same or different sizes. Reservoirs 1210A, 1210B and 1210C may be formed in between each of the EO membranes 1216A, 1216B and 1216C to contain the fluid 224 as it passes through pores 226A, 226B, 226C between EO membranes 1216A, 1216B, 1216C.

As can further be seen from the exploded view of the portions 1216C-1 and 1216C-2 defining the pore 226C of EO membrane 1216C, the EO membranes may further include an insulating layer 1220 and electrodes 218A, 218B on both the top and bottom sides. Such a stack up of EO membranes with electrodes on each side and reservoirs in between as shown creates multiple stages to the pump assembly. For example, a first EO stage may be created at EO membrane 1216C, a second EO stage may be created at EO membrane 1216B and a third EO stage may be created at EO membrane 1216A. In addition, where the pore sizes and arrangements vary from layer to layer, a staged inhibition of fluid flow in the power off state due to back pressure from the EO membrane may be achieved. For example, pump assembly 1200 may be designed to go from low pressure to high pressure and minimize the required power to achieve a certain high pressure. This, in turn, helps to reduce power consumption targets without negatively impacting the pressure produced by the electroosmotic drive. In other aspects, an opposite pore arrangement is contemplated to achieve expansion and higher deflection. Representatively, in some aspects where increasing compression is desired, the pore sizes closer to the driven member 202 may be larger and less densely spaced, and decrease in size and become more densely spaced toward the reservoir 1210C.

Figure 13:
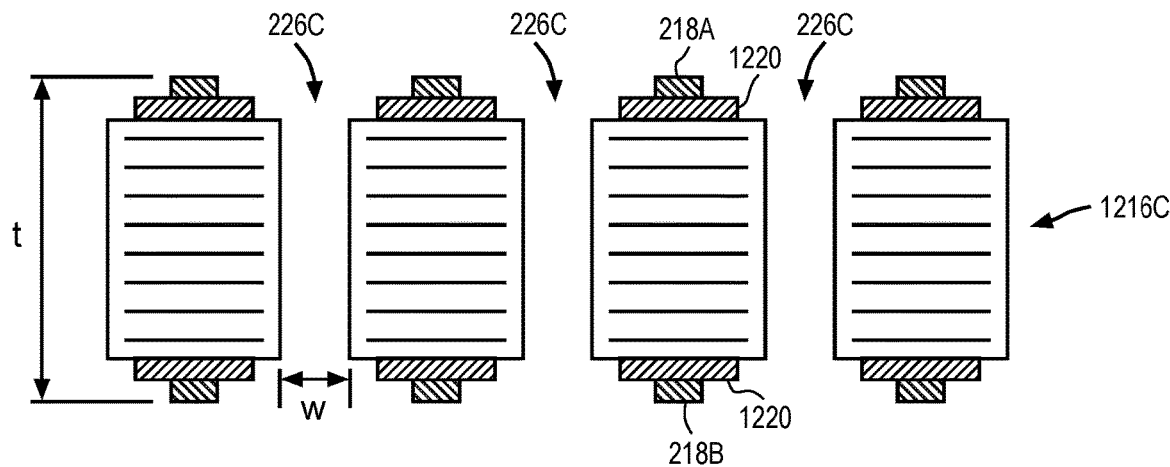
FIG. 13 illustrates an exploded cross-sectional side view of a fluid pathway of a valve of the portable electronic device of any one of FIGS. 1-9 or FIG. 12.

FIG. 13 is an exploded cross-sectional view of another aspect of an EO membrane formed using MEMS processing techniques. Representatively, EO membrane 1216C is similar to the previously discussed stack up of EO membranes in that it includes pores 226C, and an insulator layer 1220 and electrode layers 218A and 218B along the top side and the bottom sides as previously discussed. As can be seen from this view, the pores 226C may have a thickness (t) and a width (w). In some aspects, the ratio of the thickness (t) to width (w) may be specially selected and targeted to achieve an electroosmotic pressure output for a given force.

Figure 14:
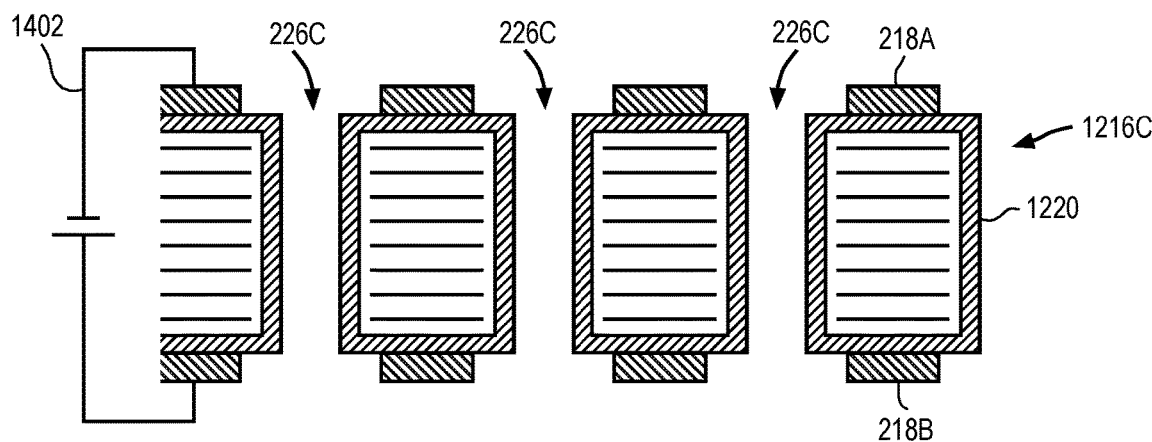
FIG. 14 illustrates an exploded cross-sectional side view of a fluid pathway of a valve of the portable electronic device of any one of FIGS. 1-9 or FIG. 12.

FIG. 14 is an exploded cross-sectional view of another aspect of an EO membrane formed using MEMS processing techniques. Representatively, EO membrane 1216C is similar to the previously discussed stack up of EO membranes in that it includes pores 226C, and an insulator layer 1220 and electrode layers 218A and 218B along the top side and the bottom sides as previously discussed. In addition, in this configuration, insulator layer 1220 is also applied along the sidewalls of the pores 226C. As illustrated by the circuit diagram 1402, a voltage may be applied to the electrodes 218A, 218B, resulting in a local net force that induces the liquid in the associated reservoir to move along the pores 226C. This, in turn, results in a bulk force that causes the associated driven member (e.g., piston and/or compliant membrane) to move toward, and seal to, the desired opening (e.g., opening 120).

Figure 15:
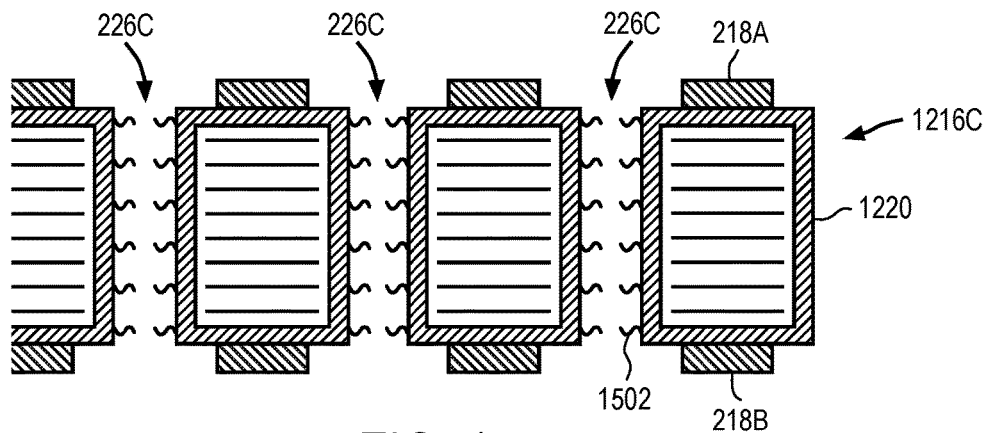
FIG. 15 illustrates an exploded cross-sectional side view of a fluid pathway of a valve of the portable electronic device of any one of FIGS. 1-9 or FIG. 12.

FIG. 15 is an exploded cross-sectional view of another aspect of an EO membrane formed using MEMS processing techniques. Representatively, EO membrane 1216C is similar to the previously discussed stack up of EO membranes in that it includes pores 226C, and an insulator layer 1220 and electrode layers 218A and 218B along the top side and the bottom sides as previously discussed. In addition, in this configuration, insulator layer 1220 is also applied along the sidewalls of the pores 226C. Moreover, in this configuration, post DRIE processing may be used to enhance the hydrophobicity of the pore sidewalls by applying a self-assembled monolayer (SAM) 1502 along the sidewalls to modify the zeta (Z) potential. In some aspects, the self-assembled monolayer (SAM) may be made of a hydrophobic chemical. Representatively, the hydrophobic chemical may include, but is not limited to, fluorinated silane or the like. In addition, although not shown, in some aspects, electrodes or electrode layers may also be formed along the sidewalls of the pores to selectively reduce the surface energy of the pores in a given stage of the EO membrane stack. For example, effectively doing something similar to an electro wetting process in which the wetting properties of the surface are modified with an applied electric field.

Figure 16:
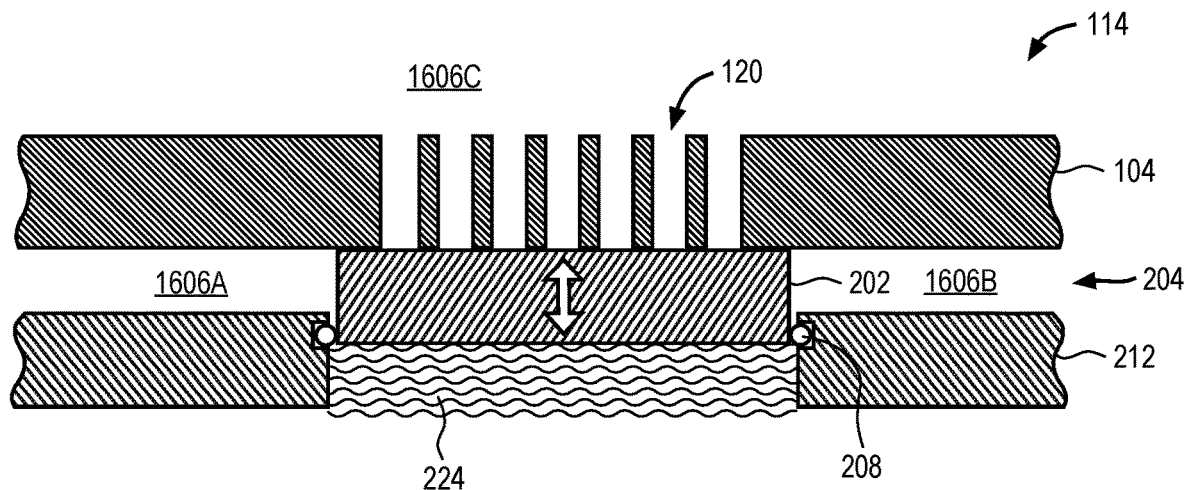
FIG. 16 illustrates an exploded cross-sectional side view of a valve of the portable electronic device of any one of FIGS. 1-9 or FIG. 12.
Figure 17:
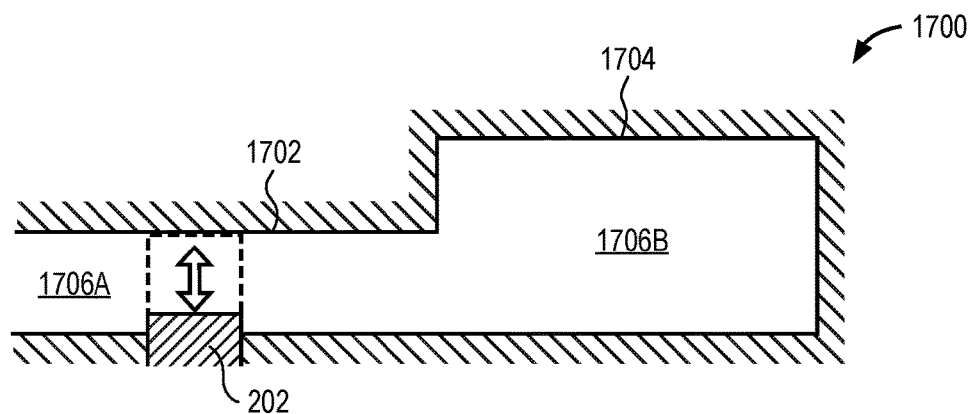
FIG. 17 illustrates an exploded cross-sectional side view of a valve of the portable electronic device of any one of FIGS. 1-9 or FIG. 12.
Figure 18:
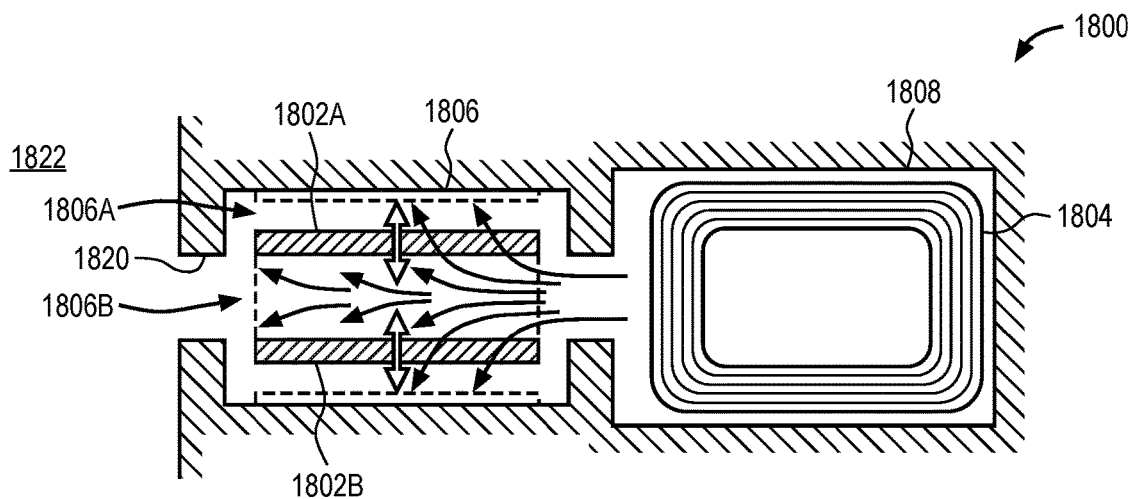
FIG. 18 illustrates an exploded cross-sectional side view of a valve of the portable electronic device of any one of FIGS. 1-9 or FIG. 12.

Referring now to FIG. 16, FIG. 17 and FIG. 18, FIGS. 16-18 illustrate exploded cross-sectional views of some representative applications of the electroosmotic valve assembly disclosed herein. Representatively, FIG. 16 illustrates an application in which the valve assembly 114 may be used to open/close a number of different volumes, cavities or chambers 1606A, 1606B, 1606C. Valve assembly 114 may be similar to the previously discussed valve assemblies and include driven member 202 that is caused to move in the direction B of the arrow by driving member 204. Although not shown for ease of discussion, driven member 202 and driving member 204 may include any one or more of the previously discussed driven or driving member components (e.g., piston, compliant membrane, stack up of EO membrane, electrodes and PCBs, etc.). In this aspect, however, the movement of the driven member 202 will open or close each of volumes, cavities or chambers 1606A, 1606B, 1606C relative to one another and/or opening 120. For example, in the closed position shown in FIG. 16, driven member 202 is advanced upward by the fluid 224 and closes or covers opening 120 to volume or chamber 1606C. In addition, driven member 202 closes any sort of pathway between volumes or chambers 1606A and 1606B. In this aspect, each of the volumes or chambers 1606A, 1606B and 1606C are closed off or isolated from one another. In other aspects, however, where the fluid 224 starts flowing away from driven member 202 such that driven member 202 moves away from opening 120, each of volumes or chambers 1606A, 1606B and 1606C may be open to one another. It is contemplated that in still further configurations, driven member 202 may move to a position such that it covers or closes opening 120 and only volumes or chambers 1606A and 1606B are open to one another. It should be understood that volumes or chambers 1606A, 1606B, 1606C may be any one or more of the previously discussed volumes or chambers associated with an electronic device or other system in which the valve assembly disclosed herein is integrated. Representatively, volumes or chambers 1606A, 1606B and/or 1606C may be any one or more of a front volume chamber, a back volume chamber, an interior chamber, an exterior chamber or an ambient environment surrounding the enclosure or device within which the valve assembly is integrated. In this aspect, it is contemplated that valve assembly may be used to open and/or close any type of volume relative to any other type of volume that is desired. For example, in phone speakers or portable time pieces using a single speaker, it may be desirable to control a front volume to back volume leak. In this aspect, chamber 1606A may be considered a front volume chamber, chamber 1606B may be considered a back volume chamber and volume 1606C may be the ambient environment. The driven member 202 of valve assembly 114 may, in turn, be moved to a position such that chamber 1606A is open to chamber 1606B, however, driven member 202 covers opening 120 to the ambient environment 1606C so that chambers 1606A-B are not open to the ambient environment 1606C. In addition, it is contemplated that in an alternative configuration, opening 120 may be omitted such that driven member 202 opens, closes or otherwise interrupt communication between only cavities 1606A and 1606B. Such an alternative configuration in which an opening, such as opening 120, at the end of driven member 202 is omitted, is illustrated in FIG. 17.

FIG. 17 illustrates a further application in which the valve assembly may be used to open/close different volumes, cavities or chambers 1707A, 1707B defined by enclosure 1700. In some aspects, enclosure 1700 may be a Helmholtz Resonator 1700. The valve assembly may be similar to the previously discussed valve assemblies and include driven member 202 that is caused to move in the direction of the arrow by a driving member. Although not shown for ease of discussion, driven member 202 and the driving member may include any one or more of the previously discussed driven or driving member components (e.g., piston, compliant membrane, stack up of EO membrane, electrodes and PCBs, etc.). In this aspect, however, the movement of the driven member 202 will open or close each of volumes, cavities or chambers 1706A and 1706B relative to one another. Representatively, Helmholtz Resonator 1700 may include a neck portion 1702 defining a chamber or volume 1706A and a body portion 1704 defining a chamber or volume 1706B. In some aspects, neck portion 1702 may open at its end to another chamber or volume, such as an interior chamber of the enclosure within which Helmholtz Resonator 1700 is implemented (e.g., a front volume chamber or a back volume chamber) or an ambient environment surrounding the enclosure within which Helmholtz Resonator 1700 is integrated. In this aspect, it may be desirable to have the chambers or volumes 1706A, 1706B open to one another, while in other aspects, it may be desirable to close off the volumes or chambers from one another, and perhaps a larger volume connected to neck portion 1702. For example, in some aspects, where Helmholtz Resonator 1700 is used in connection with a transducer assembly, for example where it is connected to a front volume chamber of the transducer assembly that is connected to the ambient environment, it may be desirable to open or close the neck portion 1702 for the purpose of tuning and/or water ingress protection. In such aspects, driven member 202 may be caused to move in the direction of the arrow by the driving member (e.g., electroosmotic pump) so it contacts upper wall of the neck portion 1702 as illustrated by the dashed line and closes neck portion 1702. In this closed position, driven member 202 isolates or closes off volume or chamber 1706B from the volume or chamber 1706A connected to neck portion 1702. When it is desired for volume or chamber 1706B to be open to volume or chamber 1706A, driven member 202 may be caused to move away from the upper wall of neck portion 1702 so that volume or chamber 1706B is once again open to volume or chamber 1706A.

FIG. 18 illustrates a further application in which the previously discussed valve assembly may be used to make dynamic acoustic circuit changes to front ports and back volumes. The valve assembly may be similar to the previously discussed valve assemblies and include driven members 1802A and 1802B that are caused to move in the direction of the arrows by a driving member. Although not shown for ease of discussion, driven members 1802A, 1802B and the driving member may include any one or more of the previously discussed driven or driving member components (e.g., piston, compliant membrane, stack up of EO membrane, electrodes and PCBs, etc.). In this aspect, however, the movement of the driven members 1802A, 1802B will change the cross-section of the volume or chamber 1806 between a cross-section 1806A defined by the wall of the volume or chamber 1806 and a smaller cross-section 1806B defined by the dashed line. Representatively, assembly 1800 may include a module or enclosure having a first enclosure portion, volume or chamber 1808 that encloses a transducer 1804 (e.g., a speaker) and a second enclosure portion, volume or chamber 1806. The second enclosure portion, volume or chamber 1806 may have an opening 1820 that connects the transducer 1804 to, for example, a volume, chamber or environment surrounding the enclosure (e.g., an ambient environment). In this aspect, the driven members 1802A, 1802B are within the chamber 1806 and define the sidewalls of a transmission line construction. The excursion of the driven members 1802A, 1802B (driven by an electroosmotic pump as previously discussed) makes it possible to make dynamic acoustic circuit changes to the chamber 1806. For example, when driven members 1802A, 1802B are in an open configuration in which they rest or otherwise contact the upper and lower sidewalls of chamber 1806 as illustrated by the dashed lines, the full cross-sectional volume 1806A of the chamber 1806 is utilized as illustrated by the outer arrows. When driven members 1802A, 1802B are actuated (e.g., a voltage is applied), driven members 1802A, 1802B may be caused to move away from the sidewalls of chamber 1806 and toward one another such that a smaller cross-sectional volume 1806B of chamber 1806 is utilized as illustrated by the interior arrows. The configuration illustrated in FIG. 18 can be used in, for example, the back volume, cavity or chamber of a speaker as well as to dynamically increase or otherwise modify the in-module resonance frequency of the speaker.

It should be understood that although certain exemplary applications are illustrated in the foregoing drawings, any other application in which a dynamically controlled electroosmotic valve assembly for opening/closing communication between chambers, openings, structures or the like are contemplated. For example, in some aspects, any one or more of the previously discussed electroosmotic valve assemblies may be used in an impulse pressure rejection application for an electronic device such as a phone. Representatively, phone impulse pressure rejection valves may use a diaphragm with a silicone surround. The electroosmotic valve assembly disclosed herein may be used to extend the back volume of the phone module to the system volume by replacing the silicone diaphragm. In this aspect, when the user presses over the display or releases it, the driven member may close the vent holes and protect overpressurizing or vacuuming the speaker module back volume. In this aspect, it is contemplated that the electroosmotic valve assembly disclosed herein may be used in a number of different applications including, but not limited to, cavity connections, acoustic circuit changes, opening/closing resonator(s) and dampers and narrow band frequency boots by acoustic short circuits.

Figure 19:
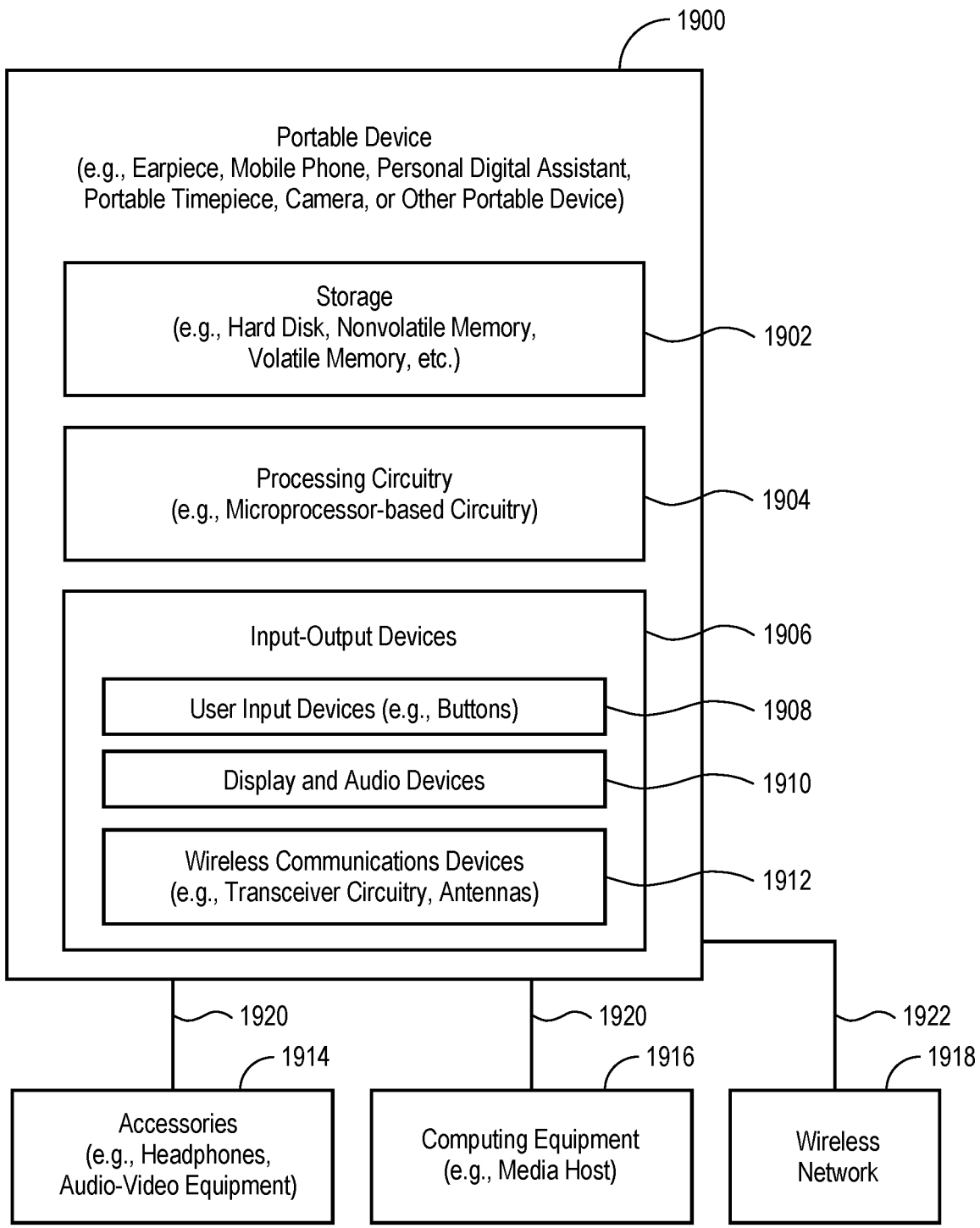
FIG. 19 illustrates a block diagram of one aspect of an electronic device within which the valve assembly of FIG. 1-FIG. 18 may be implemented.

FIG. 19 illustrates a block diagram of one aspect of an electronic device within which the previously discussed transducer and/or valve assembly may be implemented. As shown in FIG. 19, device 1900 may be any type of portable device within which a transducer and/or valve assembly disclosed herein may be desired, for example, an earpiece (e.g., in-ear earpiece, hearing aid or the like), mobile phone, personal digital assistant, portable timepiece, camera or other portable device. Device 1900 may include storage 1902. Storage 1902 may include one or more different types of storage such as hard disk drive storage, nonvolatile memory (e.g., flash memory or other electrically-programmable-read-only memory), volatile memory (e.g., battery-based static or dynamic random-access-memory), etc.

Processing circuitry 1904 may be used to control the operation of device 1900. Processing circuitry 1904 may be based on a processor such as a microprocessor and other suitable integrated circuits. With one suitable arrangement, processing circuitry 1904 and storage 1902 are used to run software on device 1900, such as internet browsing applications, voice-over-internet-protocol (VOIP) telephone call applications, email applications, media playback applications, operating system functions, etc. Processing circuitry 1904 and storage 1902 may be used in implementing suitable communications protocols. Communications protocols that may be implemented using processing circuitry 1904 and storage 1902 include internet protocols, wireless local area network protocols (e.g., IEEE 802.11 protocols—sometimes referred to as Wi-Fi®), protocols for other short-range wireless communications links such as the Bluetooth® protocol, protocols for handling 3G or 4G communications services (e.g., using wide band code division multiple access techniques), 2G cellular telephone communications protocols, etc.

To minimize power consumption, processing circuitry 404 may include power management circuitry to implement power management functions. For example, processing circuitry 1904 may be used to adjust the gain settings of amplifiers (e.g., radio-frequency power amplifier circuitry) on device 1900. Processing circuitry 1904 may also be used to adjust the power supply voltages that are provided to portions of the circuitry on device 1900. For example, higher direct-current (DC) power supply voltages may be supplied to active circuits and lower DC power supply voltages may be supplied to circuits that are less active or that are inactive. If desired, processing circuitry 1904 may be used to implement a control scheme in which the power amplifier circuitry is adjusted to accommodate transmission power level requests received from a wireless network.

Input-output devices 1906 may be used to allow data to be supplied to device 1900 and to allow data to be provided from device 1900 to external devices. Display screens, microphone acoustic ports, speaker acoustic ports, and docking ports are examples of input-output devices 1906. For example, input-output devices 1906 can include user input-output devices 1908 such as buttons, touch screens, joysticks, click wheels, scrolling wheels, touch pads, key pads, keyboards, microphones, cameras, etc. A user can control the operation of device 1900 by supplying commands through user input devices 1908. Display and audio devices 1910 may include liquid-crystal display (LCD) screens or other screens, light-emitting diodes (LEDs), and other components that present visual information and status data. Display and audio devices 1910 may also include audio equipment such as speakers and other devices for creating sound. Display and audio devices 1910 may contain audio-video interface equipment such as jacks and other connectors for external headphones and monitors.

Wireless communications devices 1912 may include communications circuitry such as radio-frequency (RF) transceiver circuitry formed from one or more integrated circuits, power amplifier circuitry, passive RF components, antennas, and other circuitry for handling RF wireless signals. Wireless signals can also be sent using light (e.g., using infrared communications). Representatively, in the case of a speaker acoustic port, the speaker may be associated with the port and be in communication with an RF antenna for transmission of signals from the far end user to the speaker.

Returning to FIG. 19, device 1900 can communicate with external devices such as accessories 1914, computing equipment 1916, and wireless network 1918 as shown by paths 1920 and 1922. Paths 1920 may include wired and wireless paths. Path 1922 may be a wireless path. Accessories 1914 may include headphones (e.g., a wireless cellular headset or audio headphones) and audio-video equipment (e.g., wireless speakers, a game controller, or other equipment that receives and plays audio and video content), a peripheral such as a wireless printer or camera, etc.

Computing equipment 1916 may be any suitable computer. With one suitable arrangement, computing equipment 1916 is a computer that has an associated wireless access point (router) or an internal or external wireless card that establishes a wireless connection with device 1900. The computer may be a server (e.g., an internet server), a local area network computer with or without internet access, a user's own personal computer, a peer device (e.g., another portable electronic device), or any other suitable computing equipment.

Wireless network 1918 may include any suitable network equipment, such as cellular telephone base stations, cellular towers, wireless data networks, computers associated with wireless networks, etc. For example, wireless network 1918 may include network management equipment that monitors the wireless signal strength of the wireless handsets (cellular telephones, handheld computing devices, etc.) that are in communication with network 1918.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting. For example, although a transducer such as a speaker or microphone is specifically disclosed herein, the valve disclosed herein could be used with other types of devices or structures. For example, in some aspects, the valve could be used to open/close the opening to an acoustic resonator or attenuator coupled to a transducer. Still further, although a portable electronic device such as a mobile communications device is described herein, any of the previously discussed valve and transducer configurations may be implemented within a tablet computer, personal computer, laptop computer, notebook computer, headphones and the like. Moreover, in some aspects, the valve assemblies disclosed herein could be used with other types of electronic devices, for example, a camera or as an electroosmotic motor or actuator assembly used to drive other components of an electronic device. Still further, it should be understood that any one or more of the aspects described or shown in the drawings herein may be optional and/or omitted and/or combined with aspects shown in other drawings, as desired. In addition, to aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A portable electronic device comprising:
    an enclosure having an enclosure wall that defines a first chamber, a second chamber, an acoustic opening from the first chamber, and an acoustic vent from the first chamber or the second chamber; and
    an electroosmotic flow valve having a driven member and an electroosmotic pump, wherein the electroosmotic pump is operable to move the driven member in a direction parallel to a direction of fluid flow through the acoustic vent between a position adjacent a substrate layer of the electroosmotic pump and a position covering the acoustic vent to open and close the acoustic vent.

2. The portable electronic device of claim 1 wherein the electroosmotic pump comprises a fluid that is actuated by an applied electrical field to drive the driven member to open and close the acoustic opening.

3. The portable electronic device of claim 2 wherein the driven member comprises a piston positioned between the acoustic opening and a fluid pathway of the electroosmotic pump through which the fluid flows once actuated to move the piston between a closed position in which the piston covers the acoustic opening and an open position in which the piston rests on the substrate layer.

4. The portable electronic device of claim 2 wherein the driven member comprises a compliant membrane aligned with the acoustic opening and sealed to a fluid pathway of the electroosmotic pump through which the fluid flows once actuated to move the compliant membrane between a closed position in which the compliant membrane covers the acoustic opening and an open position in which the compliant membrane opens the acoustic opening.

5. The portable electronic device of claim 4 wherein the driven member further comprises a piston aligned with the acoustic opening and coupled to the compliant membrane.

6. The portable electronic device of claim 2 wherein the electroosmotic pump comprises an electroosmotic membrane positioned between a first electrode coupled to a first printed circuit board and a second electrode coupled to a second printed circuit board, a fluid reservoir coupled to the second printed circuit board and a fluid pathway through the electroosmotic pump.

7. The portable electronic device of claim 6 wherein the electroosmotic membrane is a first electroosmotic membrane and the fluid reservoir is a first fluid reservoir, the electroosmotic pump further comprises a second electroosmotic membrane positioned between a third electrode coupled to a third printed circuit board and a fourth electrode coupled to a fourth printed circuit board, and a second fluid reservoir coupled to the fourth printed circuit board and the fluid pathway through the electroosmotic pump.

8. The portable electronic device of claim 6 wherein the electroosmotic membrane comprises a plurality of pores defining a portion of the fluid pathway.

9. The portable electronic device of claim 8 wherein at least one pore of the plurality of pores comprises a sidewall having an arrangement of recessed regions each having a depth and a height.

10. The portable electronic device of claim 1 wherein the portable electronic device comprises an in-ear earphone, the first chamber is a front volume chamber of the in-ear earphone and the acoustic opening is an acoustic vent from the front volume chamber to an ambient environment surrounding the enclosure.

11. The portable electronic device of claim 1 wherein the enclosure wall defines a Helmholtz Resonator having a neck portion comprising the first chamber and a body portion comprising the second chamber.

12. A portable electronic device comprising:
    an enclosure comprising an enclosure wall defining an interior chamber and an acoustic opening from the interior chamber;
    a transducer positioned within the interior chamber and dividing the interior chamber into a first chamber comprising a first side of the transducer and the acoustic opening and a second chamber comprising a second side of the transducer; and
    an electroosmotic flow valve having a driven member and an electroosmotic pump, wherein the electroosmotic pump is operable to move the driven member in a direction parallel to a direction of fluid flow through a vent to the first chamber or the second chamber between a position adjacent a substrate layer of the electroosmotic pump and a position covering the vent to open and close the vent.

13. The portable electronic device of claim 12 wherein the driven member comprises a piston coupled to an electroosmotic pump having a fluid pathway, and wherein a fluid flows through the fluid pathway upon application of an electrical field to move the piston between a closed position in which the piston covers the vent and an open position in which the piston rests on the substrate layer.

14. The portable electronic device of claim 13 further comprising a compliant membrane coupled to the piston and the fluid pathway to seal the fluid flowing through the fluid pathway within the electroosmotic pump.

15. The portable electronic device of claim 13 wherein the electroosmotic flow valve comprises a compliant membrane sealed to an electroosmotic pump having a fluid pathway, and wherein a fluid flows through the fluid pathway upon application of an electrical field to move the piston between the closed position in which the piston closes the vent and the open position in which the piston opens the vent.

16. The portable electronic device of claim 12 wherein the vent is between the first chamber and the second chamber.

17. The portable electronic device of claim 12 wherein the substrate is a first printed circuit board, and the electroosmotic pump further comprises:
    a first electrode coupled to the first printed circuit board;
    an electroosmotic membrane coupled to the first electrode;
    a second electrode coupled to the electroosmotic membrane;
    a second printed circuit board coupled to the second electrode; and
    a fluid reservoir for containing a fluid and coupled to the second printed circuit board and a fluid pathway through the electroosmotic pump.

18. The portable electronic device of claim 17 wherein the electroosmotic membrane comprises a plurality of pores of different sizes defining a portion of the fluid pathway.

19. An electroosmotic actuator assembly comprising:
a driven member operable to transition between a first position and a second position;
a driving member operable to drive the transition of the driven member using an electroosmotic flow of a fluid, the driving member having a first driving member stack up comprising:
an electroosmotic membrane;
a first electrode coupled to a first side of the electroosmotic membrane;
a second electrode coupled to a second side of the electroosmotic membrane;
a fluid reservoir for containing the fluid; and
a fluid pathway extending through the driving member from the fluid reservoir to the driven member; and
a second driving member stack up coupled to the first driving member stack up and having a fluid pathway coupling a fluid reservoir of the second driving member stack up to the fluid reservoir of the first driving member stack up, and wherein the fluid pathway of the first driving member stack up comprises a number of pores having a different size than a number of pores of the fluid pathway of the second driving member assembly.

20. The electroosmotic actuator assembly of claim 19 wherein the first driving member stack up further comprises:
a first printed circuit board coupled to the first electrode; and
a second printed circuit board coupled to the second electrode, and
wherein the fluid reservoir is coupled to the second printed circuit board.

21. The electroosmotic actuator assembly of claim 19 wherein the second driving member stack up comprises:
an electroosmotic membrane;
a first electrode coupled to a first side of the electroosmotic membrane;
a second electrode coupled to a second side of the electroosmotic membrane; and
a fluid reservoir for containing the fluid.

22. The electroosmotic actuator assembly of claim 19 wherein at least one pore of the number of pores comprises a scalloped sidewall.

23. The electroosmotic actuator assembly of claim 19 wherein each pore of the number of pores comprise a sidewall and a self-assembled monolayer of hydrophobic chemical coupled to the sidewall.

24. The electroosmotic actuator assembly of claim 19 wherein the electroosmotic actuator assembly is an electroosmotic flow valve, and the driven member transitions between the first position and the second position to open or close an acoustic opening of an electronic device within which the electroosmotic actuator assembly is integrated.

25. The electroosmotic actuator assembly of claim 19 wherein the driven member forms a sidewall of a transmission line of an acoustic chamber of a speaker and the transition of the driven member is operable to modify a resonance frequency of the speaker.

26. The electroosmotic actuator assembly of claim 19 wherein the electroosmotic actuator assembly is an electroosmotic motor.

* * * * *